United States Patent [19]
Frederick et al.

[11] Patent Number: 5,796,109
[45] Date of Patent: *Aug. 18, 1998

[54] UNITIZED RADIATION DETECTOR ASSEMBLY

[75] Inventors: Larry D. Frederick, Huntsville; Larry D. Frederick, Jr., Madison, both of Ala.

[73] Assignee: Frederick Energy Products, Huntsville, Ala.

[*] Notice: The term of this patent shall not extend beyond the expiration date of Pat. No. 5,742,057.

[21] Appl. No.: 814,908

[22] Filed: Mar. 12, 1997

Related U.S. Application Data

[63] Continuation-in-part of Ser. No. 642,525, May 3, 1996.

[51] Int. Cl.⁶ .................................................. G01T 1/20
[52] U.S. Cl. .................. 250/368; 250/361 R; 250/483.1
[58] Field of Search ........................... 250/361 R, 367, 250/368, 483.1, 256

[56] References Cited

U.S. PATENT DOCUMENTS

| | | |
|---|---|---|
| 2,902,603 | 9/1959 | Ferre . |
| 2,945,955 | 7/1960 | Mossop et al. . |
| 2,949,534 | 8/1960 | Youmans . |
| 3,049,620 | 8/1962 | George et al. . |
| 3,073,954 | 1/1963 | Carlson et al. . |
| 3,950,646 | 4/1976 | Whitlock . |
| 3,960,756 | 6/1976 | Noakes . |
| 4,004,151 | 1/1977 | Novak . |
| 4,008,945 | 2/1977 | Schere . |
| 4,063,803 | 12/1977 | Wright et al. . |
| 4,158,773 | 6/1979 | Novak . |
| 4,275,298 | 6/1981 | Wykes et al. . |
| 4,360,773 | 11/1982 | Novak et al. . |
| 4,383,175 | 5/1983 | Toepke . |
| 4,666,251 | 5/1987 | Liberman et al. . |
| 4,676,817 | 6/1987 | Tailor . |
| 4,764,677 | 8/1988 | Spurney . |
| 4,833,320 | 5/1989 | Hurlbut . |
| 4,900,937 | 2/1990 | Dayton et al. . |
| 4,994,673 | 2/1991 | Perna et al. . |
| 5,046,854 | 9/1991 | Weller et al. . |
| 5,047,635 | 9/1991 | Leaney et al. . |

(List continued on next page.)

FOREIGN PATENT DOCUMENTS 306-770  10/1983  U.S.S.R. .......................... 250/361 R

*Primary Examiner*—Edward J. Glick
*Attorney, Agent, or Firm*—Dickstein Shapiro Morin & Oshinsky LLP

[57] ABSTRACT

A unitized scintillation detector, employing a scintillation element and a photomultiplier tube housed within inner and outer housings for protection against shock, and a scintillation shock assembly. The scintillation element is encased within potting material, which is enclosed within a rigid shield. A reflective coating or tape may be used to optimize light impulse transmission from the element to the photomultiplier. The element is further protected from shock by an elastomeric boot disposed around the shield and within the housing. Elastomeric material cushions the element on one end and a spring system protects the other end. The spring system is pre-loaded against the shield, not the element. Dual windows interfacing the scintillation element and photomultiplier tube at the other end of the element create an hermetic seal. The photomultiplier tube is encased within an elastomer with outwardly directed projections. The photomultiplier tube is protected from radial and axial shock as well as thermal excursions. The optical window is hermetically sealed through the use of a thin braze ring. Alternatively, the window may be hermetically sealed by applying a metal layer directly to the circumference of a sapphire rod or other suitable transparent material by plasma-spraying. The metal may be titanium or layers of titanium, aluminum and/or inconel. The applied metal coating may be shaped, machined and/or etched for interfacing with other structures or containers. The metal coated rod may be sliced into wafers. The wafers may be used to form the hermetically sealed optical windows.

22 Claims, 15 Drawing Sheets

U.S. PATENT DOCUMENTS

| | | |
|---|---|---|
| 5,070,249 | 12/1991 | White . |
| 5,087,818 | 2/1992 | Bellian et al. . |
| 5,120,963 | 6/1992 | Robinson et al. . |
| 5,132,539 | 7/1992 | Kwasnick et al. . |
| 5,182,791 | 1/1993 | Pollack . |
| 5,264,154 | 11/1993 | Akiyama et al. . |
| 5,283,439 | 2/1994 | Bouissou et al. . |
| 5,317,158 | 5/1994 | McElhaney et al. . |
| 5,332,906 | 7/1994 | Lauf et al. . |
| 5,338,937 | 8/1994 | Daghighian et al. . |
| 5,397,893 | 3/1995 | Minette . |
| 5,408,097 | 4/1995 | Wraight et al. . |
| 5,548,116 | 8/1996 | Pandelisev . |

UNITIZED RADIATION DETECTOR ASSEMBLY

This is a continuation-in-part of U.S. patent application Ser. No. 08/642,525, the entire disclosure of which is incorporated herein by reference.

BACKGROUND OF THE INVENTION

The present invention relates generally to electro-optical devices for detecting radiation within a well bore. More particularly, the present invention relates to a support and shock absorbing system for a radiation detector as well as optical windows for use in radiation detectors. The present invention also relates generally to hermetically sealed windows and a method of making hermetically sealed windows. More particularly, the invention relates to hermetically sealed windows, utilizing a thin braze ring and sapphire, which are useful with scintillation elements in harsh environments having high shock and vibration and high temperature ranges. The invention also relates to a process for producing fully hermetic optical windows by plasma spraying metal directly onto the surfaces of suitable optical materials. The invention also relates to the plasma-built hermetically-sealed optical windows themselves.

Radiation detectors are well known in the drilling industry and are often incorporated into drilling tools for oil wells and the like. Radiation detectors typically include a light detecting device, such as a photomultiplier tube, and a scintillation crystal element, or a suitably compounded element. The scintillation element functions by capturing radiation from the formation around a well bore. The radiation may be ambient radiation emitted from the formation due to radioactive materials found in the formation, or may be radiation emitted from the formation in response to bombardment of the formation by radiation sources within the drilling equipment.

A scintillation element responds to gamma radiation by transforming the radiation energy into light energy. The light energy is transmitted through an optical window in scintillation detectors into a light detecting device, such as a photomultiplier tube. The light impulses are transformed in the light detecting device into electrical impulses which are transmitted to a computerized instrumentation system.

Radiation detectors may be incorporated into an instrumentation package which is lowered into the well bore for the specific purpose of logging characteristics of the formations through which the well is bored. Such detectors instead may be incorporated into the drilling equipment so that it is used simultaneously with the drilling operation, also called Measurement-While-Drilling ("MWD") or Logging-While-Drilling (LWD) operations. It is in MWD and/or LWD operations that the greatest demands are placed on scintillation elements, since it must function continuously while at high temperatures within the well bore and be able to withstand the radially and axially directed shock and vibration encountered during the drilling operation.

Various attempts have been made to reduce the effects of shock experienced by radiation detectors. Some of the efforts were aimed at reducing the shock experienced by the photomultiplier tubes. Examples of such efforts include U.S. Pat. No. 5,070,249 (White) and U.S. Pat. No. 5,120,963 (Robinson). Other efforts were directed to radially cushioning the scintillation element and axially biasing the element toward the photomultiplier tube to create an optical coupling between the element and the photomultiplier tube. Examples of such efforts include U.S. Pat. No. 4,360,733 (Novak), U.S. Pat. No. 4,383,175 (Toepke), U.S. Pat. No. 4,764,677 (Spurney), U.S. Pat. No. 4,900,937 (Dayton), and U.S. Pat. No. 4,994,673 (Perna).

The prior art efforts aimed at protecting the photomultiplier tube are unsatisfactory in several respects and do not address the problem of assuring long-term performance of the fragile scintillation element. In some of the prior art systems, the scintillation element is rigidly connected to the photomultiplier tube through an optical window. The rugged and harsh drilling environment in which radiation detectors may operate is not conducive for such an arrangement, and the fragile scintillation elements are often damaged by vibrational shock. Furthermore, in traditional arrangements, the optical coupling materials between the scintillation element and the photomultiplier tube are often quickly worn unless relative motion between these elements is limited.

Various techniques have been employed to create a hermetic seal between an optical window and a metallic material. Glass has been heated and bonded to a metal and/or mechanically contained by the metal. However, glass has poor strength and sealing characteristics, requiring thick glass be used.

Sapphire has also been used to make windows for other applications; however, sapphire has not been used in scintillation packages used in gamma ray detectors. Sapphire has a high melting point, and consequently, cannot be bonded with metals in the manner used to bond glass with metals. Conventional methods for bonding sapphire to metal have attendant problems. Conventional brazing of sapphire to a metal typically has been accomplished using a tapered, thin ring. The sapphire floats within such a tapered ring and is hermetically sealed to the ring upon the melting of the braze material. Oftentimes, the sapphire is not positioned properly within its housing, namely the optical axis of the sapphire is not parallel to a longitudinal axis of the detector assembly. Proper position of the sapphire affects the interface of the sapphire with other elements within the detector, which in turn affects the spatial requirements of the package to be loaded within the detector housing. Further, the scintillation element is packaged tightly within its support structure, which requires strength at the optical window. Misplacement of the sapphire may affect the position of the scintillation element in the housing, the location of the interface of the scintillation element with the photomultiplier tube, or both.

U.S. Pat. Nos. 4,008,945 (Schere), 4,063,803 (Wright), 4,666,251 (Liberman), 5,046,854 (Weller), and 5,182,791 (Pollack), the entire disclosures of which are incorporated herein by reference, illustrate optical windows and systems for providing sealed windows.

SUMMARY OF THE INVENTION

The problems of the prior art are overcome to a great extent by the present invention, which relates to an axial support system and a radial support system which reduce the relative motion of the various light gathering elements when exposed to high vibrations, shocks and temperatures. The present invention also relates to a radiation detector with means for receiving and transforming radiation into light impulses, means for receiving and quantifying the light impulses and an improved support means around the light impulse receiving and quantifying means.

In accordance with a preferred embodiment of the present invention, a unitized radiation detector is provided wherein the radiation receiving and transforming means and the light impulse receiving and quantifying means are protected. The unitized radiation detector is housed within a detector housing.

The light impulse receiving and quantifying means is immediately encased within an elastomeric material including a plurality of outward projections. The elastomeric material is itself encased within an inner housing including a plurality of openings in its circumference. The inner housing is surrounded by an elastomeric boot.

The openings in the inner housing receive the outward projections of the elastomeric material. This arrangement allows the outward projections to provide radial support to the light impulse receiving and quantifying means, while also helping to keep such means centered within the detector housing.

In another aspect of the present invention, a system is provided for protecting the radiation receiving and transforming means against physical shock and moisture contamination. Included within the radiation detector is a rigid scintillation shield, a series of radially disposed shock absorbing means, an optical coupling transparent to light impulses, an end cap and a scintillation detector housing.

In a preferred embodiment of the invention, the scintillation element is encased within the scintillation shield. A potting material may also be placed around the scintillation element within the shield. The shield itself is radially supported within the radiation detector housing by the series of radially disposed shock absorbing means.

The shield is axially loaded toward the optical coupling by the end cap. In this fashion, the scintillation crystal is positioned toward the optical coupling without being placed under undue stress.

The optical coupling may be formed of two optical windows and at least two elastomeric interfaces. One of the optical windows is bonded to the shield. Hermetic seals at the optical window bonded to the shield and at the end cap prevent moisture from leaking in and contaminating the scintillation element.

The present invention also relates to a method of making a composite optical product. In one aspect of the invention, the composite product is made by providing a transparent optical material and applying a metallic material onto the surface of the optical material by plasma spraying.

The present invention further relates to a method of making a hermetically-sealed optical window using sapphire as the light transmitting element. In one aspect of the invention, the window is made by first forming a composite optical product by applying at least one layer of metal onto the surface of an optical material by plasma spraying, and then slicing the composite optical product into one or more wafers.

In another aspect of the invention, the window is made by brazing a metallic material around the circumference of an optical material, such as a sapphire wafer, and welding the metallic material to a scintillation element housing.

In another aspect of the invention, the light transmitting element is made of sapphire and is brazed directly to the scintillation element housing.

In a preferred embodiment, the optical material includes a sapphire rod and the metal includes titanium powder. In another aspect of the invention, a layer of aluminum or inconel may be applied onto an innermost layer of titanium.

An object of the present invention is to protect the fragile scintillation element and photomultiplier tube from vibrational shock in a manner that assures long-term reliability.

Another object of the invention is to reduce the motion of the scintillation element relative to the exterior housing and the optical window, to thereby reduce the production of triboluminescence caused by vibrational shock.

Another object of the invention is to reduce the shock-induced motion of the photomultiplier tube, which enhances its ability to receive and quantify the light impulses. Thus, with the present invention, the light output performance of a photomultiplier tube may be improved.

Another object of the invention is to provide a high quality, durable, fully hermetic sapphire window that provides efficient transmission of light, particularly in the wavelengths between about 310 and 530 mm, and providing a large aperture giving a maximum field of view of the scintillation crystal.

Another object of the invention is to provide a window with a metal-to-optical material seal that is economical to manufacture.

Another object of the invention is to provide an optical window with a metallic outer layer adapted to be hermetically welded directly to metal structures.

Another object of the invention to provide hermetically sealed optical windows that can be easily integrated to various geometries.

Another object of the invention is to combine the increased strength of sapphire in the form of a thinner optical window, a unique radial support and a dual stage axial support in order to allow for, respectively, a longer scintillation element, a larger diameter scintillation element, and increased space within the scintillation element assembly.

Another object of the invention is to utilize titanium in the various housings used in radiation detectors so as to make such housings thinner, thereby increasing the space for a larger scintillation element.

Another object of the invention is to provide lower attenuation of gamma rays by using titanium housings.

Another object of the invention to provide a rugged, hermetically sealed window for use within devices such as oil well detectors, gamma ray detectors, and scintillation detectors.

The above and other objects, advantages and features of the invention will be more readily understood from the following detailed description of the invention which is provided in connection with the accompanying drawings.

DETAILED DESCRIPTION OF PREFERRED EMBODIMENTS

Figure 1:
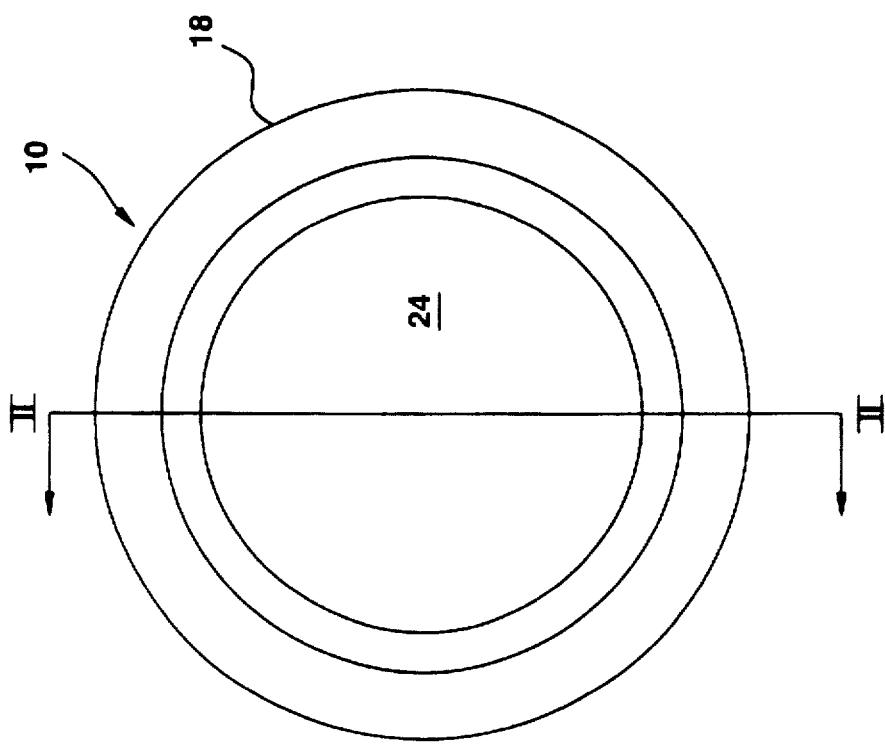
FIG. 1 is an end view of a downhole detector assembly constructed in accordance with a preferred embodiment of the present invention.
Figure 2:
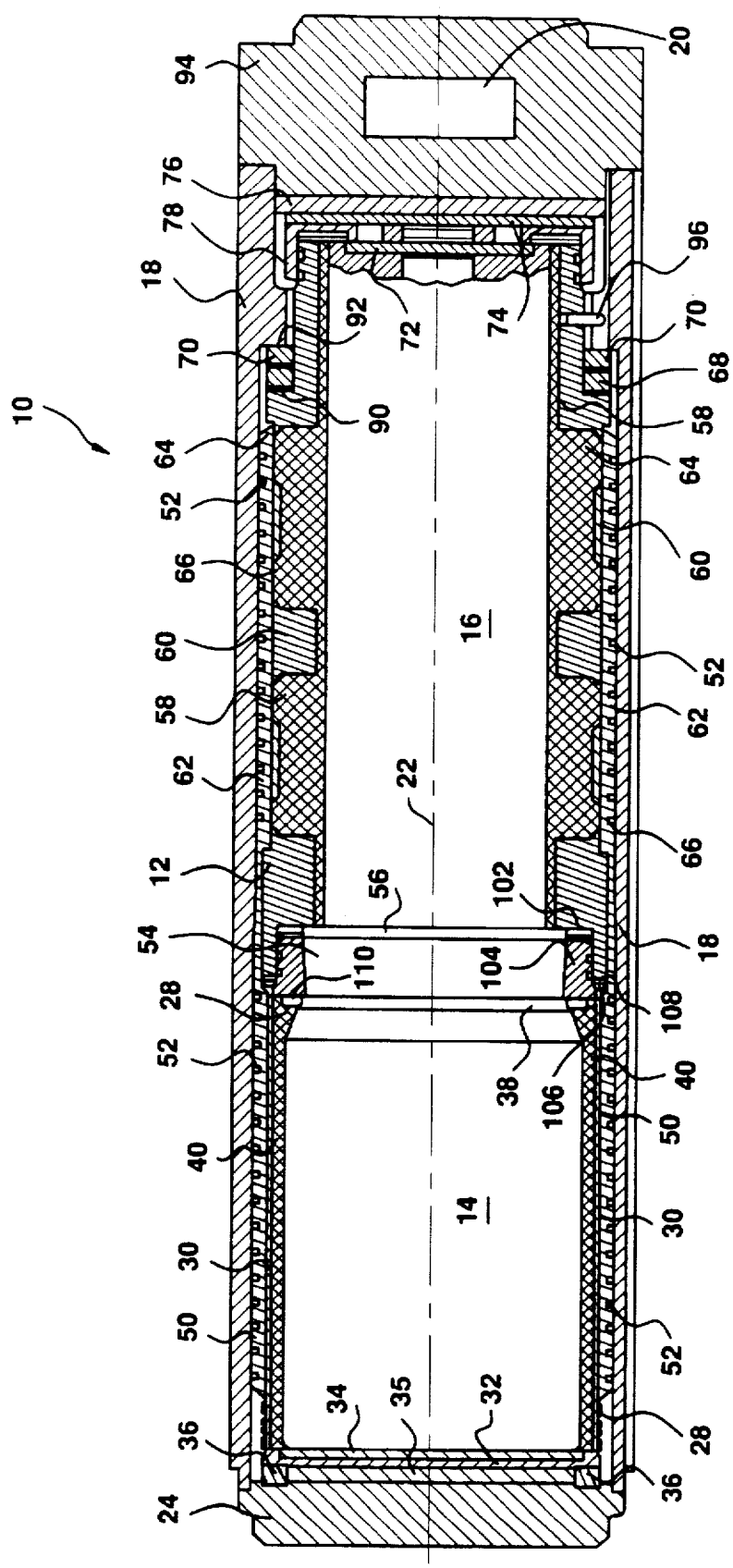
FIG. 2 is a cross-sectional view of the downhole detector assembly of FIG. 11 taken along line II—II.

Referring now to the drawings, where like reference numerals indicate like elements, there is shown in FIGS. 1 and 2 a unitized radiation detector assembly 10 constructed in accordance with the principles of the present invention. The assembly 10 includes a scintillation package 12, which includes a scintillation element 14 and a photomultiplier tube 16. The package 12 is located within a detector housing 18. It should be understood that the present invention is usable in MWD applications as well as numerous other applications such as environmental measurements made by drilling into the earth, scientific probes in harsh environments such as on the surface of other planets, and harsh commercial and industrial applications such as nuclear plants.

The scintillation element 14 is preferably a sodium-iodide (NaI) crystal. The element 14 receives radiation from the well bore (not shown), transforms the radiation into light impulses and transmits the light impulses to the photomultiplier tube 16. The photomultiplier tube 16 receives and quantifies the light impulses and transmits information pertaining to the light impulses to an electronic assembly 20 (discussed in more detail below).

All of the elements of the detector assembly 10 are cylindrical or annular and are axially symmetric about a longitudinal axis 22.

The nature of the scintillation package 12 allows for complete refurbishment and/or replacement of the package 12, the scintillation element 14 and the photomultiplier tube 16 in the field.

Enclosing one end of the detector assembly 10 is a scintillation element end retainer 24 which is fastened to the housing 18 by way of a weld. The housing 18 is preferably made of a beryllium-aluminum hybrid material but may be made of any other suitable material.

Surrounding the scintillation element 14 is a potting material 28. The material 28 has shock absorbing properties, and may be made of a suitable elastomer. The material 28 may be in powder form. The material 28 is encased within a scintillation shield 30. The shield 30 is open at both ends.

Shield 30 may be manufactured from any suitable material, such as stainless steel, titanium or aluminum. Titanium has a lower attenuation than many metals, including stainless steel, which is the industry standard for MWD and LWD applications. Thus, use of titanium provides lowered attenuation and high strength, while also increasing the space available for a crystal. Titanium is also preferred because it is compatible with sapphire. Specifically, titanium and sapphire have similar coefficients of thermal expansion and titanium can be effectively brazed to sapphire. Aluminum is not as preferred as titanium because, even though it has a lower attenuation than titanium, aluminum is not as strong as titanium, so thicker aluminum is required, which increases its attenuation and decreases the amount of space available for a crystal.

A scintillation element end plate 32 is attached to the open end of the scintillation shield 30 closest to the end retainer 24. Sandwiched between the scintillation element 14 and the end plate 32 is a first scintillation element expansion pad 34. Located between the end plate 32 and the end retainer 24 is a second scintillation element expansion pad 35. Positioned radially exterior to the second expansion pad 35 are a plurality of scintillation element compression springs 36. A transparent elastomeric layer 38 is positioned on the other end of the element 14.

The elastomeric layer 38, the expansion pads 34, 35 and the compression springs 36 provide axial support and cushioning for the element 14. In addition, the expansion pad 34 and the elastomeric layer 38 provide expansion room for the scintillation element 14. This expansion room is required due to the high range of thermal environments with which the unitized radiation detector assembly 10 is subjected. The radiation detector assembly may be subjected to cold environments prior to insertion into the well bore, as well as hot environments once in the well bore. Further, the thermal coefficient of expansion for the element 14 is substantially different than that of the other materials of the detector assembly 10. Specifically, crystals have a high coefficient of thermal expansion.

Completely wrapped around the element 14, within the potting material 28, is a reflective tape 40. The tape 40 reflects light impulses and enhances their transmission into the photomultiplier tube 16, which is positioned beyond the elastomeric layer 38.

Sandwiched between the shield 30 and the exterior housing 18 is an annular boot 50. The boot 50 has treads 52 for providing axial traction. The boot 50 and the potting material 28 provide radial cushioning for the scintillation element 14.

The light impulses transformed by the scintillation element 14 are transmitted through the elastomeric layer 38, through an optical window 54, then through a transparent photomultiplier tube elastomeric layer 56 (described in more detail below) and then into the photomultiplier tube 16.

The photomultiplier tube 16 is encased within elastomeric element 58, which is further encased within a photomultiplier tube housing 60.

Sandwiched between the housing 60 and the unitized detector housing 18 is an elastomeric boot 62. The boot 62 (like the boot 50 surrounding the scintillation element 14) has treads 52 for providing axial traction.

As a way of centralizing the photomultiplier tube 16 within the unitized detector housing 18 and to provide radial cushioning for the photomultiplier tube 16, the photomultiplier tube elastomeric element 58 includes a plurality of outwardly extending projections 64. The photomultiplier tube housing 60 additionally has a plurality of openings 66. The projections 64 fit into the openings 66.

The photomultiplier tube 16 is axially supported and cushioned by compression springs 68 and spacers 70, photomultiplier tube pads 72, 74 and 76, and a compression cap 78.

The photomultiplier tube housing 60 includes a projecting shelf 90. In close proximity to the shelf 90 is a second projecting shelf 92, which is part of the unitized detector housing 18. The compression springs 68 and the spacers 70 are positioned between the two shelves 90, 92.

The compression cap 78 and the photomultiplier tube pads 72, 74, 76 are located at the end of the photomultiplier tube 16 farthest from the optical window 54. The first pad 72 is sandwiched between one end of the photomultiplier tube 16 and the compression cap 78. The compression cap 78 is threadedly attached to the housing 60 to provide the desired fit of the photomultiplier tube 16 to the elastomer layer 56.

The photomultiplier tube second pad 74 is positioned on the opposite side of the compression cap 78 from the first pad 72. The second pad 74 is sandwiched between the photomultiplier tube third pad 76 and the compression cap 78. The second and third pads 74, 76 structurally isolate the compression cap 78 from a photomultiplier tube end retainer assembly 94 (described in detail below). The compression cap 78 axially biases the photomultiplier tube 16 toward the optical window 54.

To prevent the photomultiplier tube 16 from rotating within the unitized detector housing 18, an anti-rotation pin 96 is positioned within the photomultiplier tube housing 60. The pin 96 fits into respective radial openings in the housings 18, 60.

The end retainer 94 is located at the end of the unitized detector assembly 10 farthest from the element 14. An electronics assembly 20 (shown schematically) may be located within the retainer 94. The retainer 94 is fastened to the unitized detector housing 18 by fasteners 100 (shown in FIG. 4).

At the end of the photomultiplier tube housing 60 closest to the optical window 54 is a photomultiplier tube housing surface 102. The photomultiplier tube elastomer layer 56 is sandwiched between the surface 102 and the optical window 54.

A metal adapter ring assembly 104, which includes an outer projection 106 projecting outwardly, is positioned radially exterior to the optical window 54. The assembly 104, which interfaces the surface 102 along with the elastomer layer 56, is positioned such that there is a space between one end of the housing 60 and the projection 106. The projection 106 fits between one end of the photomultiplier tube housing 60 and one end of the scintillation shield 30. Within the space between those two ends is fitted a window assembly lock ring 108 which encircles the assembly 104. The assembly 104 is conjoined to the optical window 54 by brazing.

As radiation exits the well bore (not shown) and enters the scintillation element 14, the scintillation element 14 transforms the radiation into light impulses. The light impulses are transmitted through the scintillation element transparent elastomeric layer 38, the optical window 54, the photomultiplier tube elastomer layer 56 and into the photomultiplier tube 16. The reflective tape 40 helps to prevent the light impulses from exiting the unitized radiation detector assembly 10 and focuses the light impulses through both optical elastomer layers 38, 56 and the optical window 54 and into the photomultiplier tube 16.

The photomultiplier tube 16 is axially biased toward the optical window 54 by the compression cap 78. This arrangement, along with the anti-rotation pin 96, helps to maintain the position of the photomultiplier tube 16 and optimize the light impulse receiving capabilities of the photomultiplier tube 16. The photomultiplier tube 16 receives and quantifies the light impulses. The photomultiplier tube 16 transmits the ascertained quantity of light impulses to the electronics assembly 20, which further transmits this information to controllers on the ground.

Figure 3:
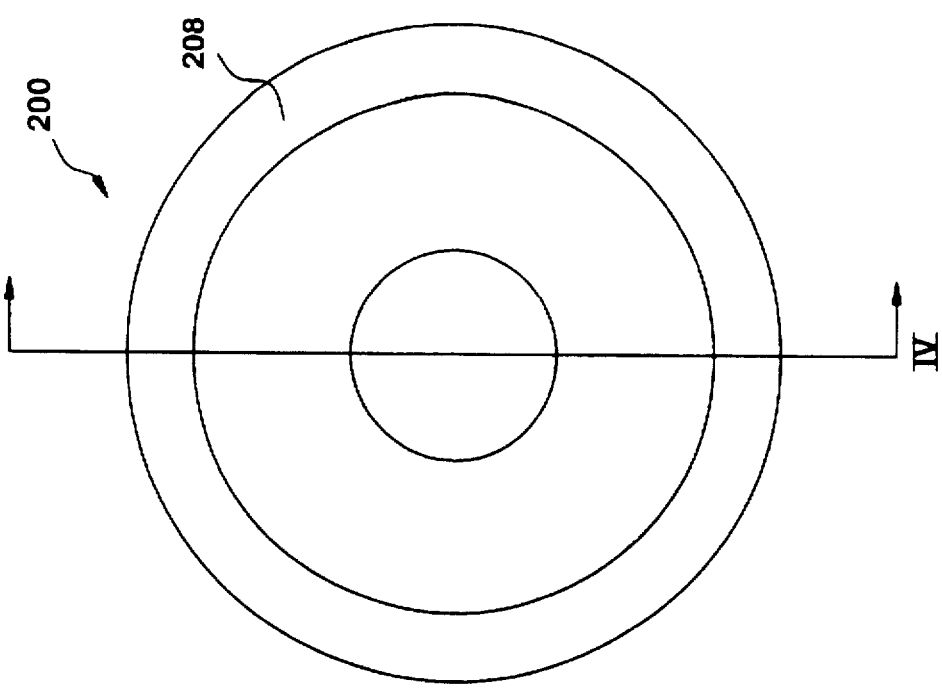
FIG. 3 is an end view of a downhole detector assembly constructed in accordance with another preferred embodiment of the present invention.
Figure 4:
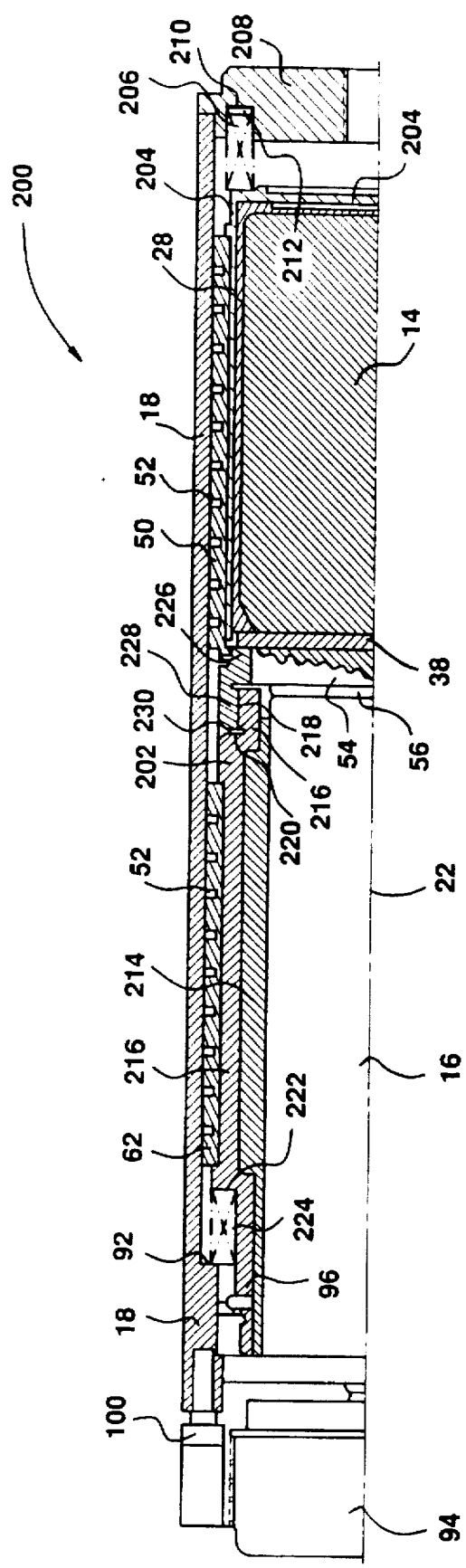
FIG. 4 is a partial cross-sectional view of the downhole detector assembly of FIG. 3, taken along line IV—IV.

A second embodiment of the present invention, as shown in FIGS. 3 and 4, includes a unitized radiation detector assembly 200. Within the detector assembly 200 is a scintillation package 202. Included within the package 202 is a scintillation element 14 and a photomultiplier tube 16. The scintillation element 14 is encased within the potting material 28, which is itself encased within a scintillation shield 204.

The shield 204 encloses all but one side of the pan 20 scintillation element 14, that side being the end of the element 14 closest to the transparent elastomeric layer 38. The element 14 is axially supported and cushioned by the elastomeric layer 38 and by a scintillation element axial spring 206. The spring 206 is sandwiched between the shield 204 and a scintillation element end retainer 208. On the face of the end retainer 208 closest to the shield 204 is a scintillation element end retainer groove 210. Within the groove 210 is positioned a scintillation element shim 212. The spring 206 is positioned such that it fits within the groove 210 and interfaces with the shim 212, while the other end of the spring 206 interfaces with an end of the shield 204. In this manner, the element 14 is axially biased towards the elastomer layer 38.

The photomultiplier tube 16 is located on the other side of the detector assembly 200 from the element 14. The photomultiplier tube 16 is positioned within a photomultiplier tube elastomeric element 214, which is itself positioned within a photomultiplier tube housing 216. The housing 216 is positioned within a photomultiplier tube elastomeric boot 62. A photomultiplier tube housing threaded portion 218 and a lock ring interface 220 are located on an end of the housing 216 closest to the element 14. A photomultiplier tube housing shelf 222 is located on an end of the housing 216 farthest from the element 14. A photomultiplier tube axial spring 224 is positioned between the shelf 222 and a second shelf 92 located in the unitized radiation detector housing 18. Additionally, an anti-rotation pin 96 is included within the housing 216 to prevent the photomultiplier tube 16 from rotating within the detector housing 18.

A photomultiplier tube elastomer layer 56 is sandwiched between an end of the photomultiplier tube 16 and the optical window 54. The optical window 54 is itself sandwiched between the elastomer layer 56 and the scintillation element elastomer layer 38. A glass/metal seal assembly 226 is located radially exterior to the optical window 54. A screw thread interface 228 is located on an internally directed face of the assembly 226.

Additionally, a lock ring 230 is located on the assembly 226. The lock ring 230 interfaces with the lock ring interface 220 of the housing 216. In addition, the screw thread interface 228 threadedly interfaces with the threaded portion 218. The side of the assembly 226 closest to the scintillation element 14 interfaces with one end of the shield 204. Through this arrangement, the photomultiplier tube 16, the optical window 54 and the element 14 are all unitized within the scintillation package 202. Because of this, the assembly 202 can be removed as one unit through the scintillation element end retainer 208.

Figure 5:
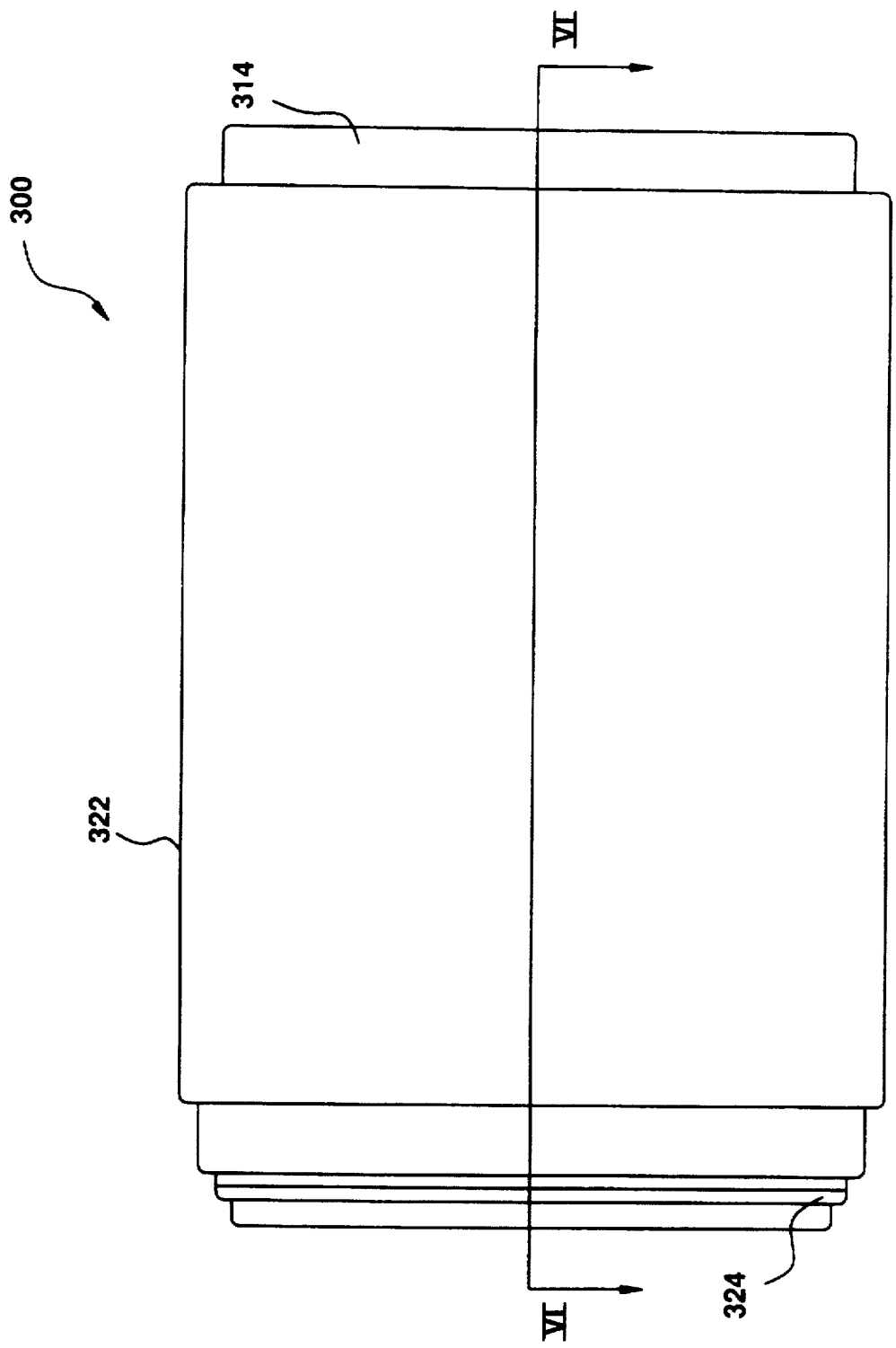
FIG. 5 is a side view of a scintillation package constructed in accordance with another preferred embodiment of the present invention.
Figure 6:
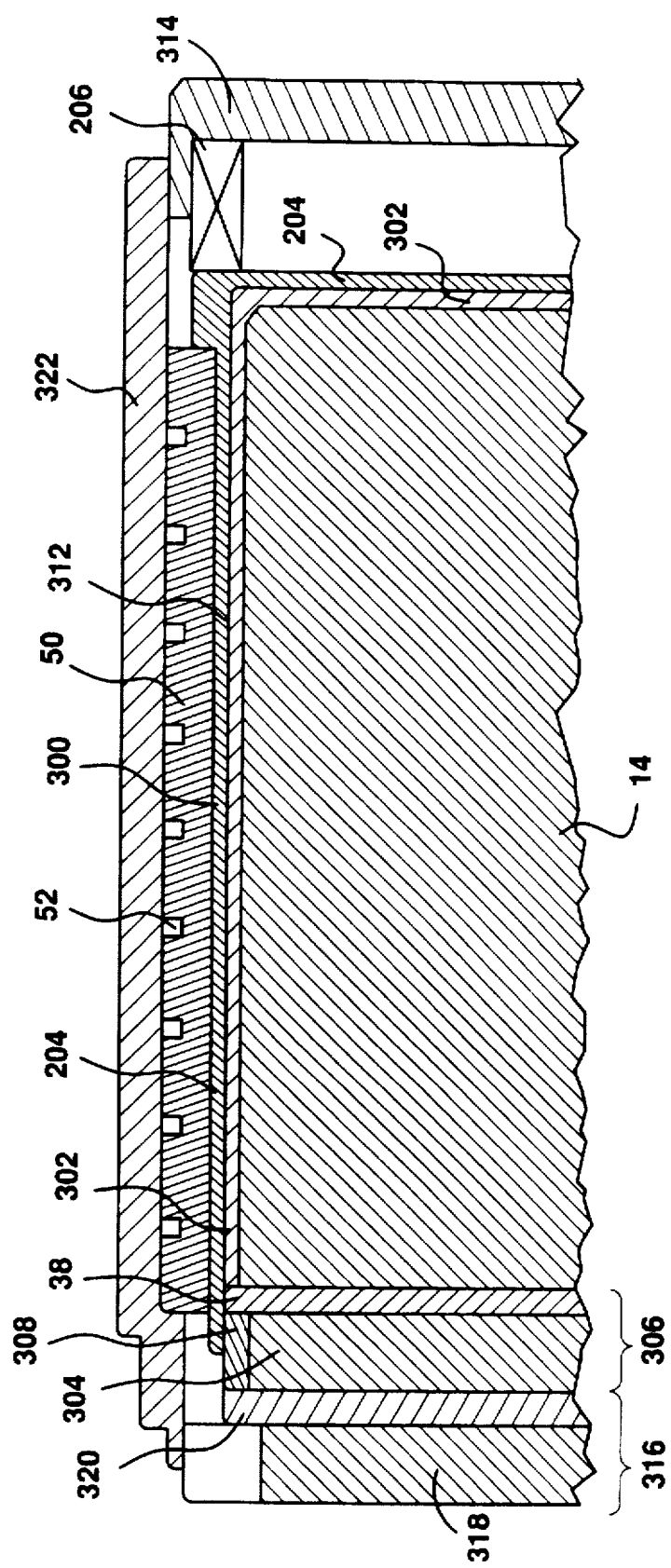
FIG. 6 is a partial cross-sectional view of the assembly of FIG. 5, taken along the line VI—VI.

With regard to FIGS. 5–6, a third embodiment of the present invention is one including a scintillation package 300. The package 300 includes the scintillation element 14.

The element 14 is encased within a potting material 302 which is made of an elastomer and may be in powder form. The potting material 302 covers all sides of the element 14 with the exception of the end closest to the photomultiplier tube 16. The potting material 302 is optically matched to the element 14, optically transparent to visible light and chemically non-reactive with its interfacing surfaces. In addition, the potting material 302 allows for thermal expansion of the element 14.

Both the element 14 and the potting material 302 are encased within the rigid scintillation shield 204, which is open at one end. In lieu of shield 204, the scintillation shield 30 and the end plate 32, as shown in FIG. 2, may be utilized.

A scintillation element optical window 304 is disposed at the open end of the shield 204. Sandwiched between the window 304 and the element 14 is the scintillation element transparent elastomeric layer 38. The window 304 and the elastomeric layer 38 make up a first optical coupling 306 adjacent to the element 14. The elastomeric layer 38 allows light impulses to be emitted from the element 14 through the window 304. In addition, the elastomeric layer 38 acts as a buffer between the element 14 and the window 304 to protect the element 14 from axially directed vibrational shock.

The window 304 is sealed to the shield 204 through the use of a scintillation element glass/metal seal 308. The seal 308 is hermetically welded to the shield 204. In addition, the window 304 has an hermetic seal about its circumference.

The interior surfaces of the shield 204 (the surfaces closest to the potting material 302) may have a light reflective coating 312 applied to them. The coating 312 has an index of refraction greatly different from the potting material 302 to reflect internally generated light of the element 14, thereby improving the light impulse output from the element 14 to the photomultiplier tube 16 (shown in FIG. 2). Alternative to or in conjunction with the coating 312, reflective tape 40, as shown in FIG. 2, may be wrapped around the element 14. Because the potting material 302 is preferably optically transparent, it will simulate the optical benefits of having direct contact between the element 14 and a reflective surface without having direct vibration and shock loading impinging on the element 14.

The scintillation package 300 circumferentially supports the element 14 by radially disposed shock absorbers 50. These shock absorbers may include an elastomeric boot. The selection and geometry of the shock absorbers 50 are interchangeable and are a function of vibration and thermal design environments. The preferred material for the shock absorbers 50 for most applications is Viton. The shock absorbers 50 function to protect the element 14 from vibration and shock.

In conjunction with the scintillation element transparent elastomeric layer 38, further support and protection from axially directed vibration and shock is provided by a scintillation element axial spring 206, which is disposed outside the end of the shield 204 opposite from the window 304. The spring 206 is pre-loaded against the scintillation shield 204 via a scintillation element end retainer 314. Hence, the spring pre-load of the spring 206 is directed at the entire package 300 instead of being focused entirely on the scintillation element 14. The end retainer 314 also creates an hermetic seal.

There are two optical couplings between the element 14 and the photomultiplier tube 16. The first optical coupling 306 has already been described, namely the elastomeric layer 38 and the window 304. A second optical coupling 316 includes a photomultiplier tube window 318 and photomultiplier tube transparent elastomeric interface 320. The interface 320 is sandwiched between the two windows 304, 318. The first optical coupling 306 creates an optical couple between the element 14 and the window 304 within the package 300. The second optical coupling 316 creates an optical couple between the package 300 and the photomultiplier tube 16.

Completely surrounding the scintillation package 300 is a radiation detector housing 322.

Element 14 is floated within shock absorbing material (the potting material 302) within a shield 204 that has its own window 304, and the complete package 300 is resiliently isolated within the housing 322. The illustrated arrangement results in greatly reduced motion between the element 14 and the housing 322. Reduced relative motion of the element 14 in turn reduces the production of triboluminescence under high vibration and shock conditions. Triboluminescence is the unintended generation of light pulses from the scintillation element and/or its support system due to mechanical motion induced by vibration or shock.

In addition, due to the method of suspending the element 14 described above, the loading that is introduced to the package 300 is resolved in a distributed manner. This manner minimizes bending and point loading of the element 14, thereby allowing the element 14 to withstand more severe vibrational and shock environments.

The characteristics of the axially disposed spring 206, as well as the radially disposed shock absorbers 50 may be modified to dynamically tune the package 300 away from dominant external input frequencies both axially and radially.

Figure 7:
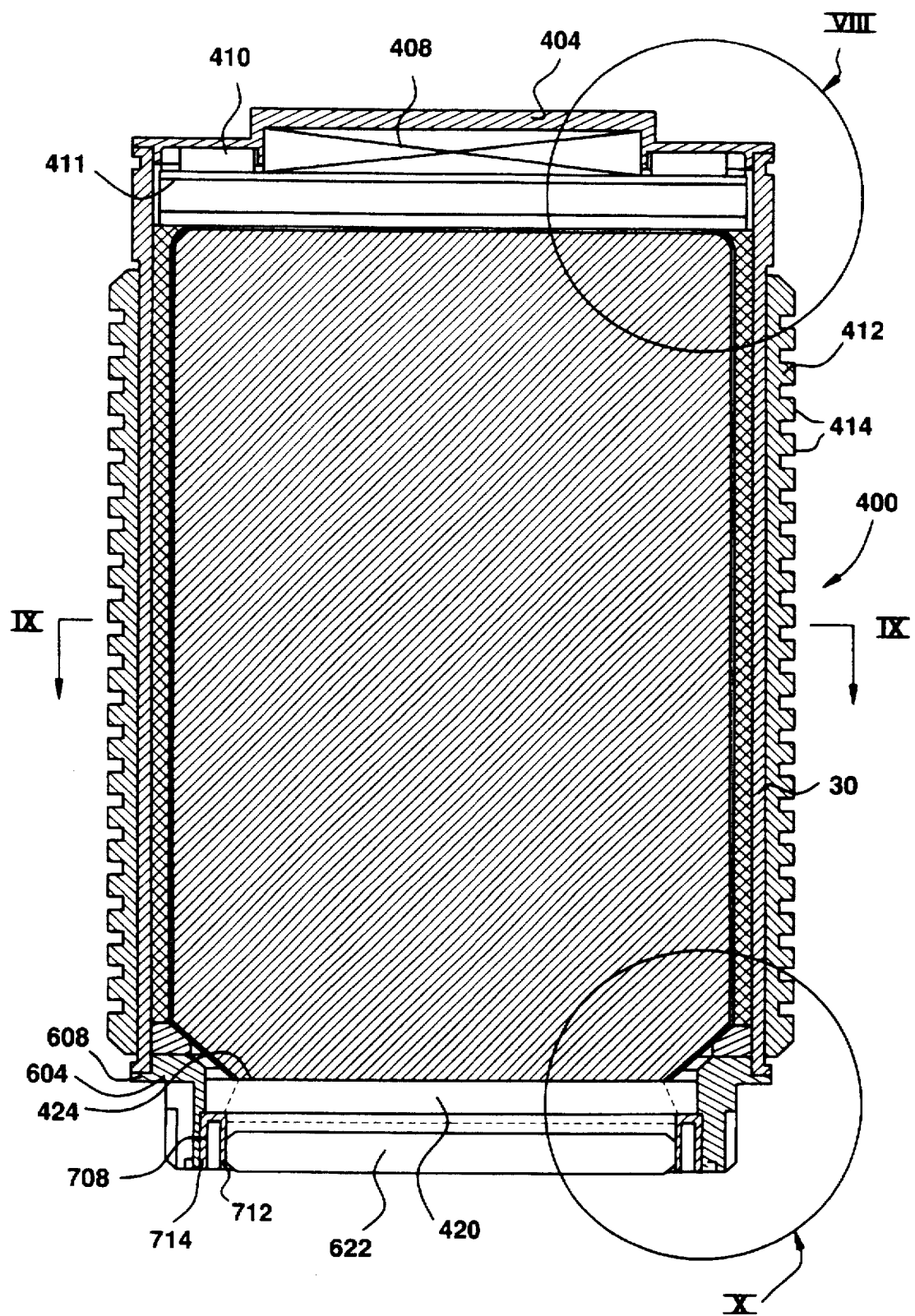
FIG. 7 is a cross-sectional view of a crystal assembly constructed in accordance with another preferred embodiment of the present invention.
Figure 8:
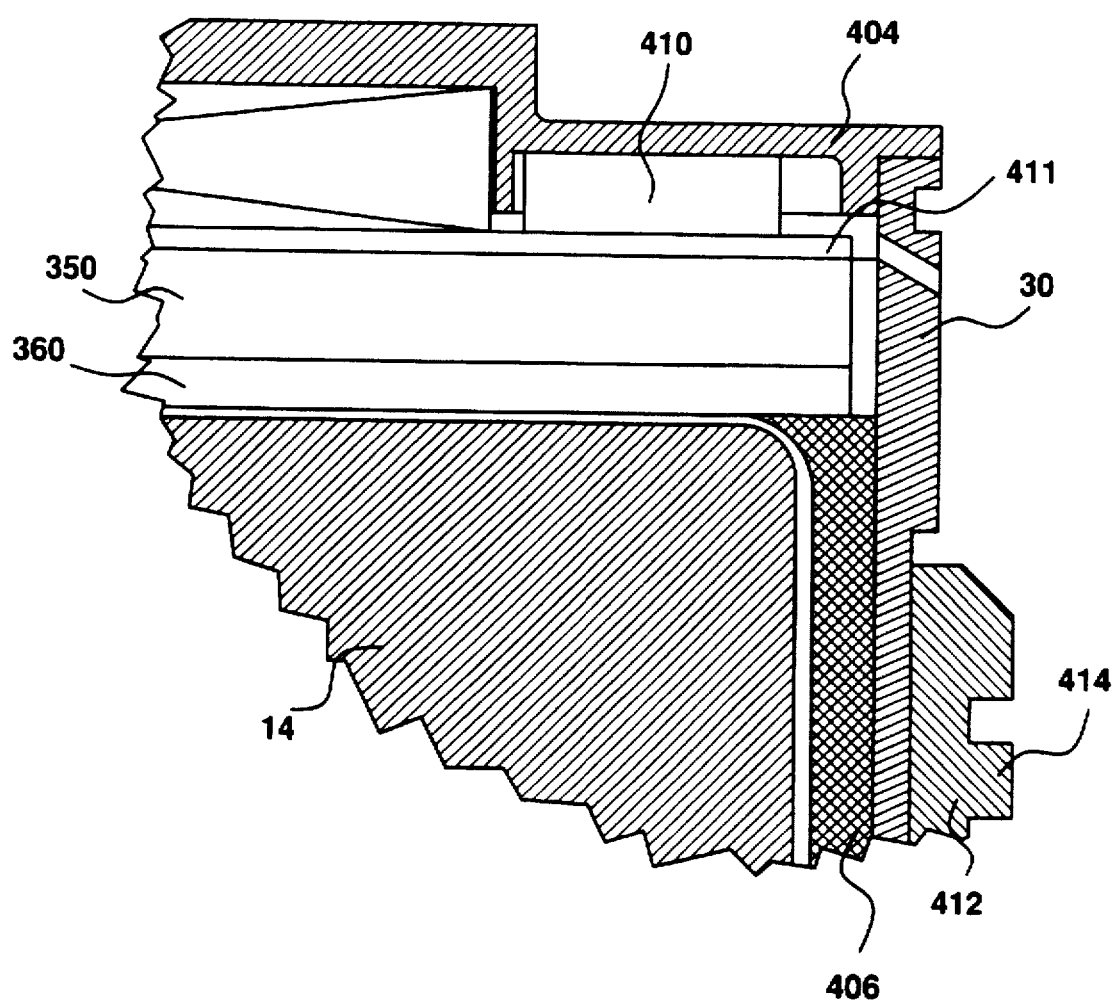
FIG. 8 is an enlarged partial view showing the area encircled by dashed line VIII in FIG. 7.

A fourth embodiment of the present invention is shown in FIGS. 7–10 including a crystal assembly 400. Crystal assembly 400 includes the scintillation element 14 as shown in FIGS. 7–8. It should be understood that the axial suspension described below with respect to the fourth embodiment is usable for embodiments 1–3 described above and is the preferred embodiment for the axial suspension system.

Scintillation element 14 is housed within a scintillation shield 30. Enclosing one end of scintillation shield 30 is a scintillation element end retainer 404 which is attached to the scintillation shield 30 by welding. Shield 30 is open at its opposite end.

Surrounding the scintillation element 14 is a potting material 406. The material 406 has shock absorbing properties, and may be made of a suitable elastomer such as silicone. The material 406 is encased within scintillation shield 30.

Sandwiched between scintillation element 14 and end retainer 404 is a metallic spring 408 adjacent to retainer 404 and an elastomeric pad 410 adjacent to element 14.

The metallic spring 408 and elastomeric pad 410 provide axial support and cushioning for the element 14. In addition, the metallic spring 408 and elastomeric pad 410 provide expansion room for the scintillation element 14. The metallic spring 408 and elastomeric pad 410 provide a pre-load on scintillation element 14 through a circular shim 411 mounted between spring 408, pad 410 and element 14. The pre-load is distributed across the face of element 14 by a metallic plate 360 disposed between the element 14 and the shim 411. Another elastomeric pad 350 is positioned between plate 360 and shim 411.

The elastomeric pad 410 and spring 408 also provide a two-stage loading on the scintillation element 14. The spring 408 is sized to provide a constant minimum force on scintillation element 14 that is sufficient to maintain adequate load during ambient and sub-ambient conditions.

The elastomeric pad 410, concentric with the metallic spring 408 and disposed outwardly therefrom, is positioned so as to begin assuming load at elevated temperatures. Such a combination allows the scintillation element 14 to deflect the required amount without developing prohibitive forces while at the same time being assured an adequate pre-load force is present at or below ambient temperatures.

Disposed radially beyond scintillation shield 30 is an annular boot 412. The boot 412 has treads 414 for providing axial traction against a housing (not shown). Annular boot 412 is bonded to scintillation shield 30 using contact cement.

Figure 9:
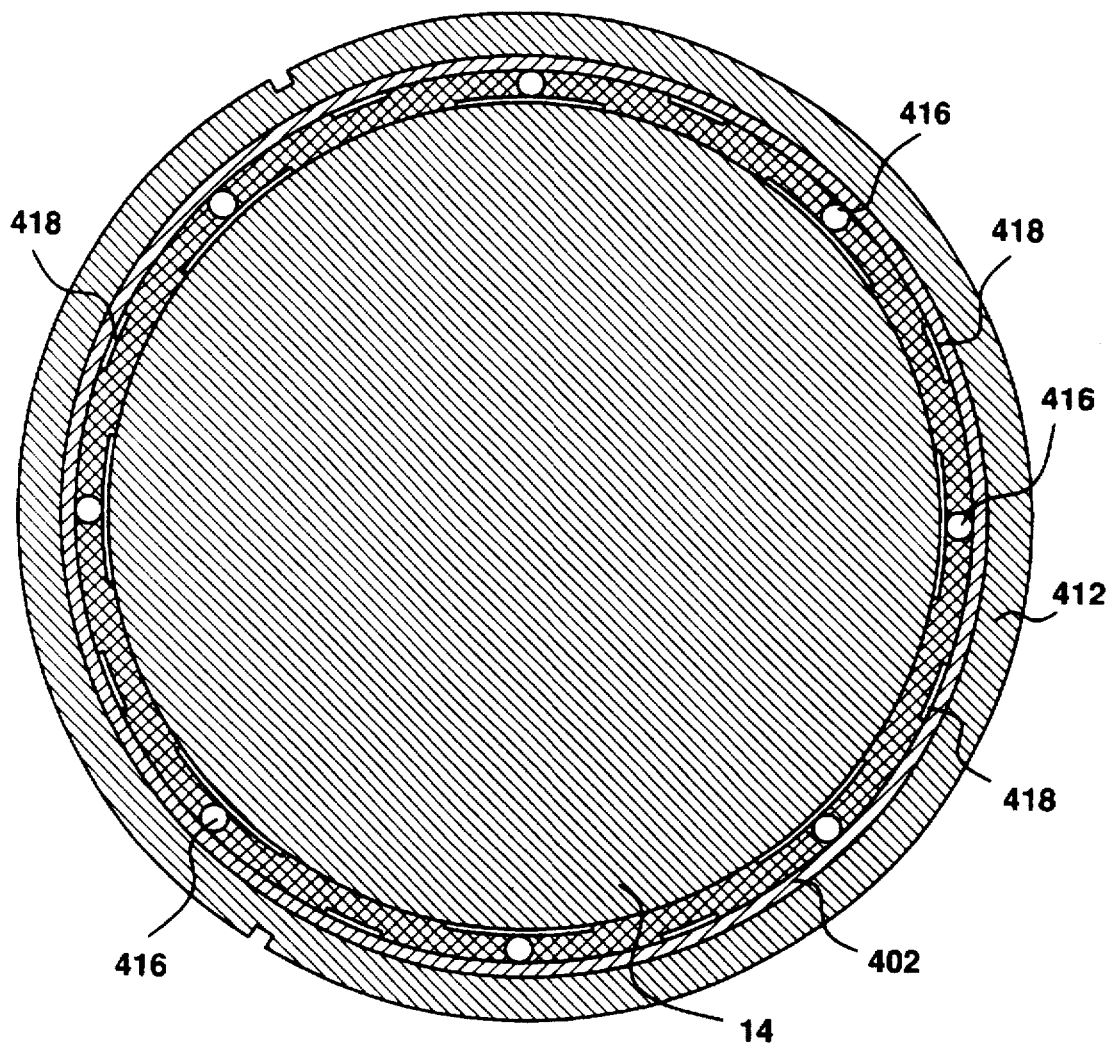
FIG. 9 is a cross-sectional view of the assembly of FIG. 7, taken along the line IX—IX.

Referring now to FIG. 9, a plurality of equally circumferentially spaced potting voids 416 are formed after potting material 406 has been set between scintillation element 14 and scintillation shield 30. These potting voids 416 allow for thermal expansion of scintillation element 14. Although eight potting voids 416 are shown, any number may be used. Also circumferentially spaced are a plurality of radial stressing means 418 which are installed after potting material 406 has set. The radial stressing means 418 provide a localized stress to the potting material 406. The stressing means 418 may be flat spring steel that is installed flat and becomes arched as shown in FIG. 9. In an alternative embodiment, the stressing means 418 may be arched spring steel preformed into an arch configuration. Radial springs 418 are generally equally circumferentially spaced between potting voids 416. The springs 416 impose a radial pre-load in localized areas compensating for the different coefficients of thermal expansion of the elements of the crystal assembly 400.

As the element 14 heats up, it expands, causing the potting material 406 to be squeezed against the shield 30. When the element 14 cools down, the areas of the potting material 406 that have been stressed by the stressing means 418 are prevented from remaining shrunken.

Disposed on the open side of scintillation shield 30 is an optically transparent optical coupling 420 and a seal assembly positioned between the optical coupling 420 and the scintillation shield 30.

Figure 10:
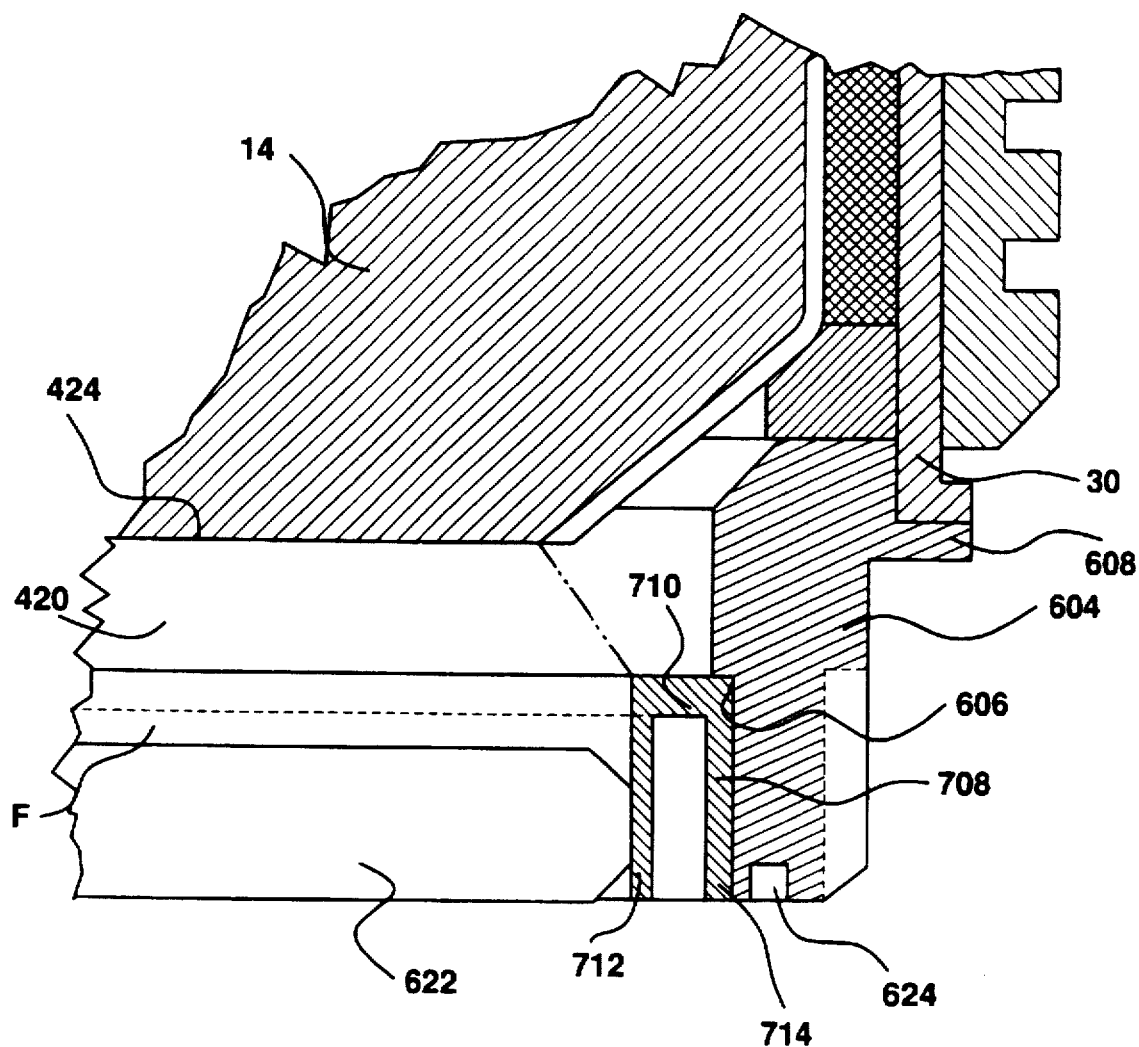
FIG. 10 is an enlarged partial view showing the area encircled by dashed line X in FIG. 7.
Figure 16:
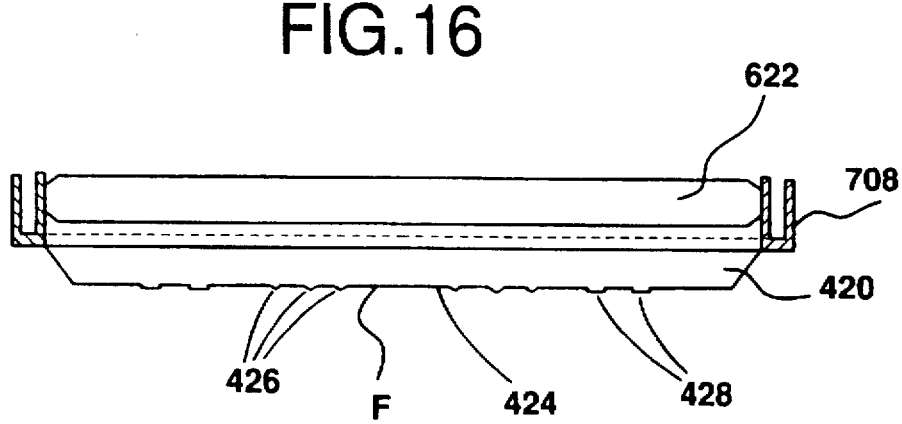
FIG. 16 is a cross-sectional view of a hermetically sealed optical window constructed in accordance with another preferred embodiment of the present invention.
Figure 17:
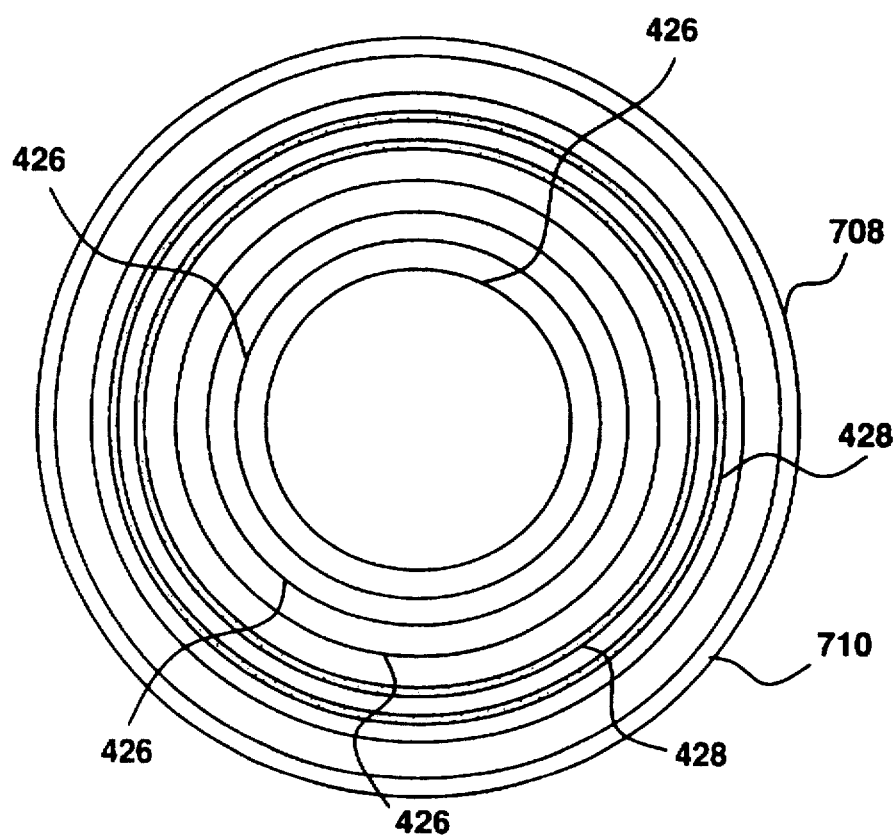
FIG. 17 is a top view of the hermetically sealed optical window of FIG. 16.

Refer now to FIGS. 10, 16 and 17, wherein a view of optical window 420 is shown. Optical window 420 has a surface 424 adjacent to the scintillation element 14. Extending outwardly from surface 424 are a plurality of concentric ridges 426, 428. Ridges 426 are triangularly shaped and ridges 428 have a flat surface 430 extending generally parallel to surface 424. As shown in FIGS. 16 and 17, ridges 428 are disposed radially outwardly relative to ridges 426. Ridges 426, 428 serve to retain a fluid which is placed between optical coupling 420 and scintillation element 14.

Refer now to FIGS. 7, 10 and 16–18, wherein the optical coupler 420 is shown with a U-shaped braze ring 708 (to be described in greater detail below). Optical coupler 420 is formed of a plurality of concentric rings of silicon. Each concentric ring provides a ridge and a valley. The outer most rings 428 are pressure rings, which have broader ridges than the triangularly shaped inner rings 426. A plurality of ridges 426, 428 are used, most preferably a total of four ridges 426 and two ridges 428. The coupler 420, as illustrated in FIGS. 7, 10, 16 and 18, is positioned between a sapphire wafer 622 (to be described in greater detail below) and the scintillation element 14. A fluid F is sandwiched between the coupler 420 and the element 14. The coupler 420, in conjunction with the fluid F, provides added axial protection to the element 14.

Second and third couplers 420 may be positioned between the photomultiplier tube 16 and the wafer 622, with the fluid F retained by the concentric ridges of each of the second and third couplers 420.

The fluid F is necessary to fill any voids created between the optical window and the element 14 or the photomultiplier tube 16 caused by thermal expansion or movement of the element 14 or the tube 16. It is also important to prevent any air gaps between the element 14 and the photomultiplier tube 16 because air has a low index of refraction which lowers the transmission efficiency of the element 14.

Any fluid which is thermally and optically compatible with the coupler 420, and which is highly viscous over the entire temperature range to which it will be subjected, may be used. Preferably, a highly viscous, optically transparent fluid which can also serve as a lubricant between the element 14 and the coupler 420 may be used. The fluid assists in maintaining a consistent stiffness of the entire arrangement, thus helping to keep the dynamic characteristics of the arrangement from changing over time. One such fluid is a fluoro-silicone fluid, and a most preferred fluid is a Dow Corning 1265 FS fluoro-silicone fluid.

The ridges 426, 428 of the concentric rings of the coupler 420 perform several important functions. The first is that they provide strength to the coupler 420. Furthermore, the outermost ridges 428, which are thicker, provide enhanced strength at a location where there is a substantial pressure gradient between the interior of the coupler and the space exterior to the coupler. The second function is to disperse the fluid pressure within the coupler 420. The third function is to assist in keeping the fluid positioned between the coupler 420 and the photomultiplier tube 16, the element 14 and the sapphire wafer 622 to prevent any air gaps from forming during high shock.

The support arrangements illustrated and discussed provide greater available space for a scintillation crystal package while concurrently providing needed protection to the package from the well bore environment.

Figure 11:
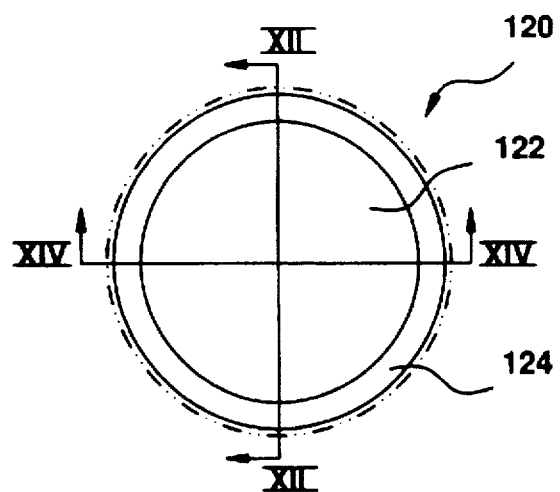
FIG. 11 is an end view of a plasma-built metal coated sapphire rod constructed in accordance with the present invention.

There is shown in FIG. 11 a composite structure 120 constructed in accordance with another preferred embodiment of the present invention. The composite structure 120 is formed of a transparent sapphire rod 122 and a surrounding metal structure 124. The metal structure 124 is formed on the surface of the rod 122 by plasma spraying.

Sapphire generally has good light transmission characteristics, and it has excellent transmission characteristics in the blue and near-ultraviolet wavelengths produced by a sodium iodide scintillation crystal. Mistakenly, sapphire has sometimes been considered an inferior transmitter of light compared with fused quartz and some types of glass. Even though the transmission of light through sapphire from a gas or vacuum, or into a gas or vacuum, can be slightly less than through some other materials, this is due in great part to the high index of refraction of sapphire. However, the use of sapphire in contact with an optical coupler, such as the coupler 420, and/or the fluid F reduces the effect of the high index of refraction. The sapphire is prevented from transmitting light into air gaps by way of the arrangement of coupler 420 in conjunction with the highly viscous fluid.

Figure 14:
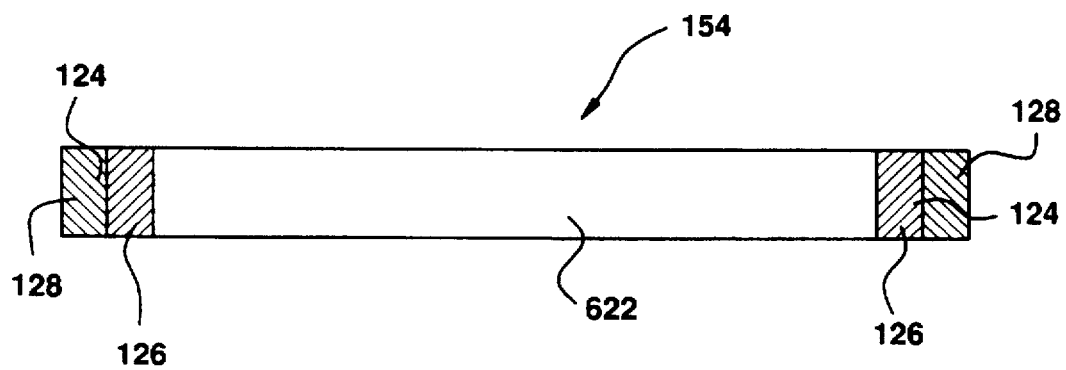
FIG. 14 is a cross-sectional view of a coated sapphire disk or wafer sliced from the composite structure of FIG. 11, taken along the line XIV—XIV of FIG. 11.

The composite structure 120 may be sliced into a plurality of relatively thin, cylindrical wafers 154 (FIG. 14). The wafers 154 may be used to form hermetically sealed windows in, for example, a radiation detector. The metal structure 124 may be made compatible for welding directly to metal housing structures within the detector such that the window is hermetically sealed within the detector.

Figure 12:
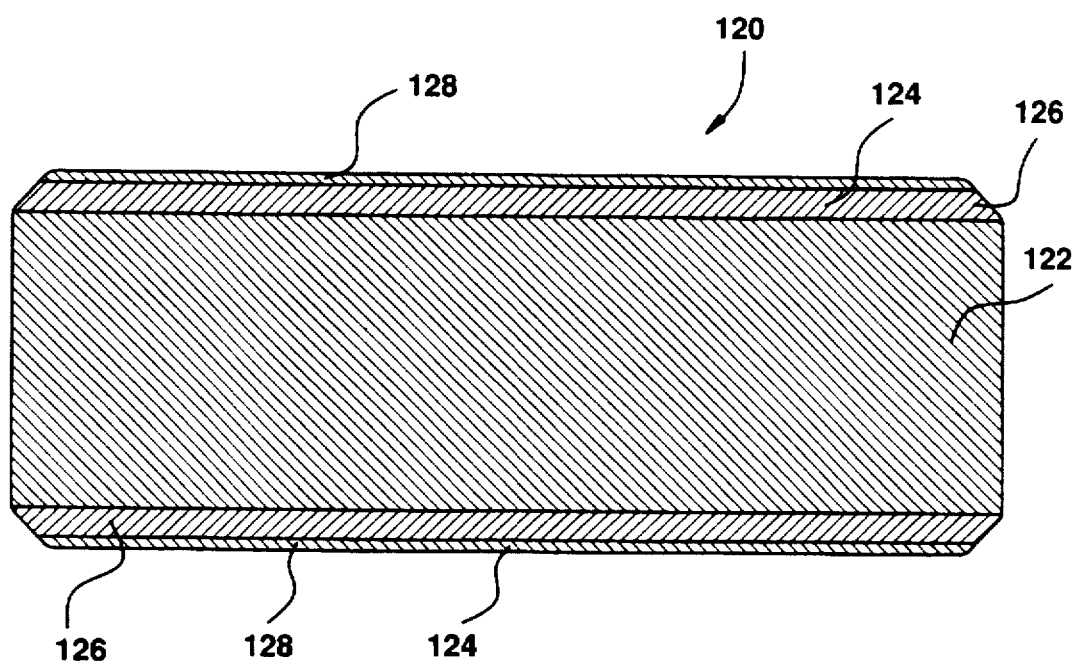
FIG. 12 is a cross-sectional view of the composite structure shown in FIG. 11, before the surface of the composite structure is machined or etched, taken along the line XII—XII of FIG. 11.

In one aspect of the invention, the metal structure 124 may be formed of inner and outer layers 126, 128 (FIG. 12). The material of the inner layer 126 may be highly compatible with the sapphire material of the rod 122 for maximum strength and bonding to the rod 122. The outer layer 128 may be made of a different metallic material that is more compatible and weldable to the metal structures within the detector.

For example, the first layer 126 can be made from plasma sprayed titanium powder; and for applications where aluminum or inconel is used within the detector, the outer layer 128 may be made from aluminum or inconel, respectively. Plasma sprayed titanium is compatible with and forms a satisfactory seal with the sapphire material, and the aluminum or inconel layer 128 can be readily welded to housing structures made from the same aluminum or inconel material. Many other substitutions and combinations are possible.

The metal structure 124, whether in one layer or in multiple layers, is applied to the sapphire rod 122 by plasma spraying. During the metal coating process, the rod 122 is heated to a temperature suitable for applying metal by plasma spraying. Simultaneously, the rod 122 is maintained in a high vacuum.

As used herein, the term "layer" is not intended to connote a single spraying of plasma, but rather a single metal whose thickness is determined in part by the number of spraying events.

Figure 13:
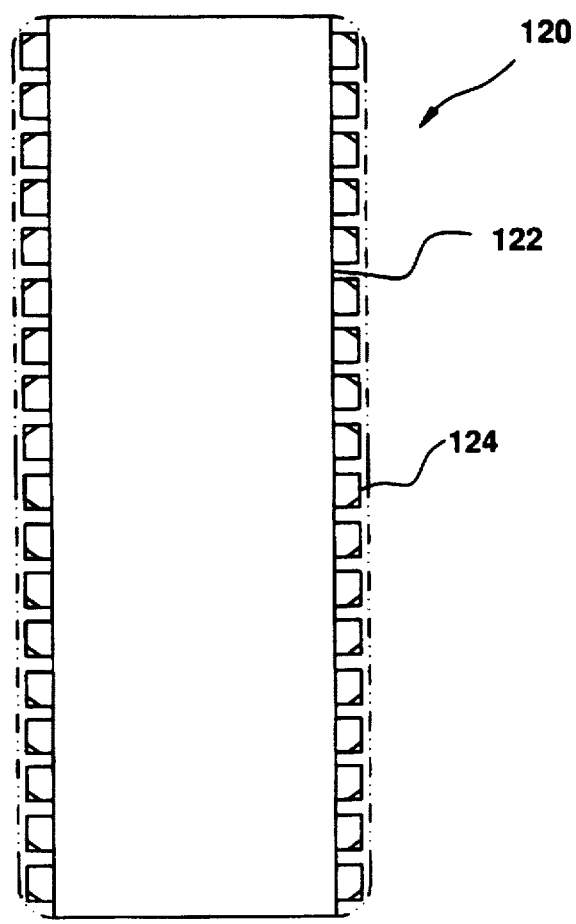
FIG. 13 is a side view of the composite structure shown in FIG. 11, after the surface of the composite structure is machined or etched.

As shown in FIG. 13, the metal-coated composite structure 120 may be machined or etched to provide suitable mechanical dimensions so that the wafer-shaped windows 154 formed from the structure 120 can be effectively interfaced to containers, housing structures or other devices. The thicknesses of the plasma sprayed materials can be increased or decreased thus allowing the finished units to be integrated to various geometries.

After any desired shaping, the metal-coated structure 120 is cut into wafers 154 and then the wafers 154 are ground and polished. The thickness of the wafer 154 along the optical axis should be such that enough optical material (e.g., sapphire) remains after grinding and polishing to maintain the flatness and parallelism of the optical material. Prior to polishing, all burrs should be removed and sharp edges should be broken.

An advantage of the invention is that many wafers 154 for optical windows may be sliced from a single sapphire rod 122 processed through a single plasma spraying operation. In particular, the composite structure 120 can be formed into wafers 154 for use in a radiation detector.

Alternatively, the sapphire rod 122 may be sliced into sapphire wafers 622, which differ from wafers 154 in that wafers 622 do not have any metal coating.

Figure 15:
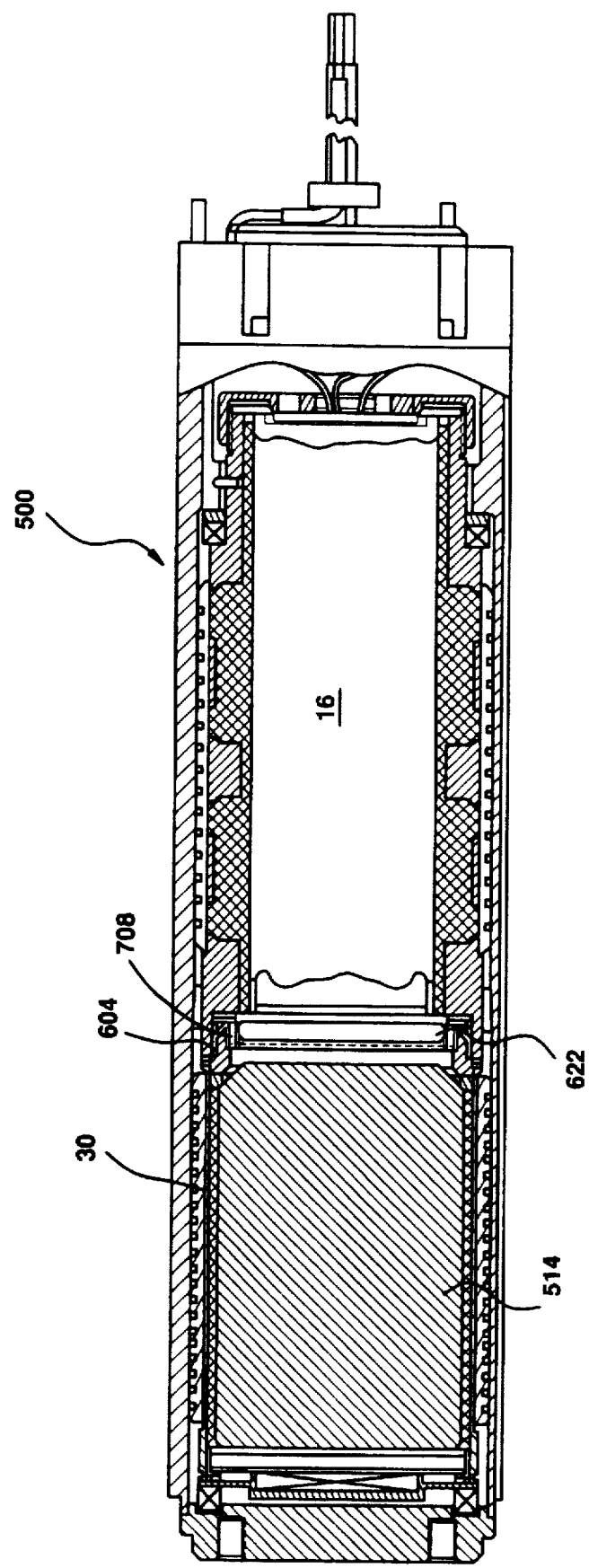
FIG. 15 is a cross-sectional view of a downhole detector assembly having a hermetically sealed optical window constructed in accordance with a preferred embodiment of the present invention.

An alternative embodiment of the present invention is illustrated in FIG. 15 showing a radiation detector 500 incorporating a sapphire wafer 622 between a crystal 514 and a photomultiplier tube 16. The wafer 622 is attached to a window housing 604 through a braze ring 708. The housing 604 is in turn attached to shield 402. Crystal 514 is identical to crystal 14 with the exception that crystal 514 is formed to larger or smaller dimensions than crystal 14.

Sapphire has an allowable design strength that is approximately ten times stronger than Pyrex glass, which is one of the stronger glasses used in such applications. The high strength of sapphire allows use of a thinner window. Thin windows are advantageous because larger crystals can be installed into a housing having a given outside dimension. In some configurations, crystals fifty percent larger than currently used crystals may be installed in a detector.

Use of thinner sapphire also reduces the size of the edge surface visible to the photomultiplier tube. This is an important feature because an electrical device that receives the light after passing through the window, typically a photomultiplier tube, integrates light across its view angle. The edges of the window are not effective reflectors of the light, so that the portion of the view angle subtended by the edge of the window is not sending significant amounts of light to the receiving element.

An alternative embodiment of the hermetically sealed optical window assembly for use in a radiation detector is illustrated in FIGS. 7 and 10. A sapphire wafer 622 is brazed to a braze ring 708. As illustrated, the ring 708 is generally U-shaped, with a base 710, a braze leg 712 and a weld leg 714. The ring 708 is accurately machined so that the dimensions provide for a good weld between the ring 708 and a window housing 604 (discussed in greater detail below).

Specifically, an outer circumference of the wafer 622 is brazed to the braze leg 712 of the ring 708. The ring 708 is manufactured from a material of suitable strength and capable of forming a bond with sapphire, such as Kovar or titanium. Kovar is especially appropriate when the scintillation shield is manufactured from stainless steel or inconel, and titanium is more appropriate when the shield is manufactured from titanium. Furthermore, sapphire has certain physical properties, such as a very high melting temperature, which prevents it from being sealed through conventional techniques used for sealing glass. However, sapphire can be brazed to titanium or special intermediate metals, such as Kovar, and some other metals.

Of importance with regard to the brazing operation is the design of the braze ring 708. Instead of a tapered ring, which has been used in conventional methods, the ring 708 has a straight braze leg 712. Through the use of a straight braze leg 712, the sapphire wafer 622 may be properly positioned within the ring 708 with exact spacing between the wafer 622 and the ring 708 in order to effect a good braze joint. Proper positioning of the wafer 622 will affect the interface of the sapphire with other elements within the detector, which in turn affects the spatial requirements of the package to be loaded within the detector housing. Further, the element 14 is packaged tightly within its support structure, which requires strength at the optical window, which can be provided by the sapphire wafer 622. Any offset of the sapphire from its proper position affects the interface between the window and the crystal. Finally, proper orientation of the sapphire wafer 622 is necessary to keep the fluid in place between the wafer 622 and both the photomultiplier tube 16 and the element 14.

Radially outside of the ring 708 is positioned a window housing 604, having a ledge 606 and a shield interface weld flange 608. The window housing 604 further includes threads for applications where it is necessary to connect the scintillation package to a photomultiplier tube assembly. The ring 708 is positioned such that the base 710 seats against the ledge 606 of the window housing 604. As noted above, the ring 708 is accurately machined so that the weld leg 714 extends so as to be flush with a window housing weld flange 624. The weld leg 714 of the ring 708 is welded to the window housing 604 at the window housing weld flange 624. The weld flange 624 has a thickness selected to achieve an effective weld in a minimum of space. If the leg 714 is flush with the weld flange 624, a small weld may be performed at that juncture, creating the hermetic seal.

The entire optical window assembly may be placed within a scintillation package such that the shield interface weld flange 608 of the window housing 604 abuts the scintillation shield 30. Further, the shield interface weld flange 608 may be welded to the shield.

The ledge 606 provides several useful functions. First, in radiation detector configurations having a high external loading, the ledge 606 provides strength to the optical window assembly as a whole to accommodate such loading. Second, the ledge 606 is machined to a high degree of accuracy on the window housing 604 so that the ledge 606 can function to properly align the braze ring 708 in order to assist in keeping the wafer 622 properly aligned within the detector.

The U-shaped design of the ring 708, as well as the window housing 604, provides protection to the sapphire wafer 622 during welding of the ring 708 to the window housing 604 and during welding of the window housing 604 to the scintillation shield 30. The design of the ring 708 allows dissipation and/or removal of heat produced in the welding process and protects the wafer 622 from the imposition of any destructive thermal gradients between the wafer 622 and the ring 708.

Specifically, the U-shaped design presents a lengthy heat pathway from the point of welding, the window housing weld flange 624, for the heat from the welding process to reach the wafer 622. Further, the abutment of the weld leg 714 against the window housing 604 presents a relatively large expanse of metal into which a majority of the heat generated from the welding process can dissipate.

Figure 18:
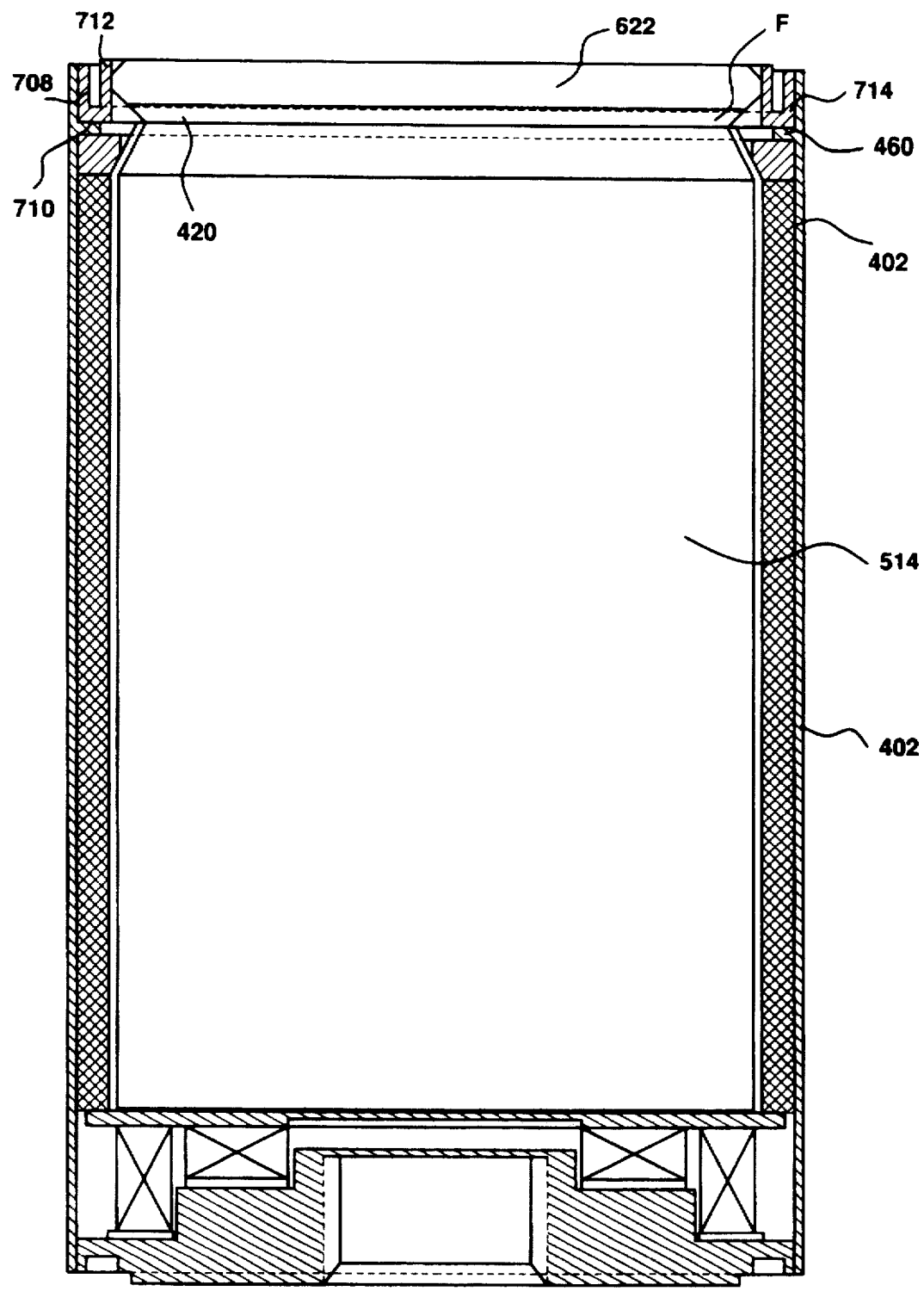
FIG. 18 is cross-sectional view of an optical window assembly having a braze ring constructed in accordance with another embodiment of the present invention.

An alternative embodiment of the hermetically sealed optical window assembly for use in a radiation detector is illustrated in FIG. 18. In this embodiment, the braze ring 708 is welded directly to scintillation shield 402, which differs from scintillation shield 30 in that it has a ledge 460 which base 710 of ring 708 abuts.

Through this arrangement, a larger diameter scintillation wafer 622 can be use. Further, this arrangement allows for accurate positioning and orientation of the wafer 622 during brazing and for accurate positioning and orientation of the window assembly as a whole within the shield 402. This arrangement also allows for effective welding without over stressing the braze joint during the welding process. Further, this arrangement allows welding to be accomplished at the shield 402 end, thus providing a smooth exterior surface of the shield 402, sometimes required for proper fitting of the shield 402 into the detector housing.

Figure 19:
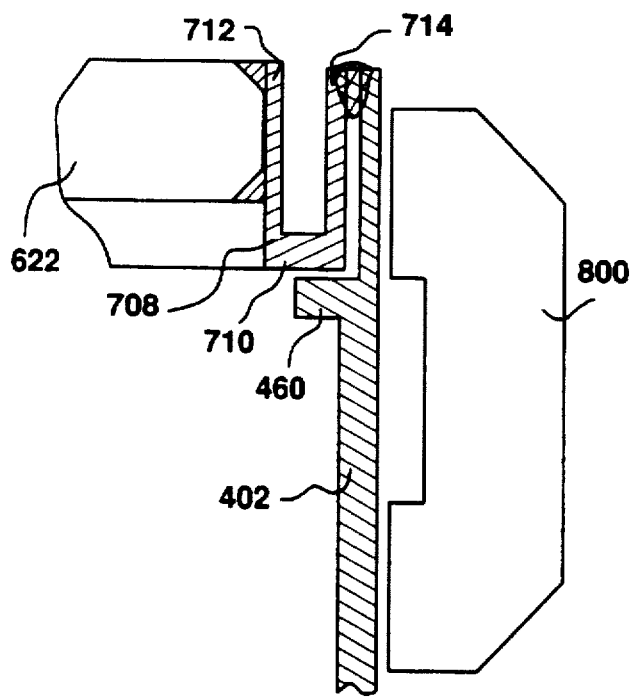
FIG. 19 is a partial cross-sectional view of an optical window assembly having a braze ring constructed in accordance with another embodiment of the present invention.

In addition, an appropriately positioned heat sink may be placed around the shield to further protect the wafer 622 during welding (FIG. 19). During the welding process, a band of metal 800 having high mass and high thermal conductivity is wrapped around the shield in near proximity to the weld. Suitable metals include copper or aluminum. The band of metal acts as a heat sink, drawing the heat generated during the welding process outwardly away from the sapphire wafer 622.

The specific welding process can be any suitable welding process which will create a hermetic seal. Specific examples are Tig welding, which is an electric arc weld with a shield gas, or electron beam welding.

Figure 20:
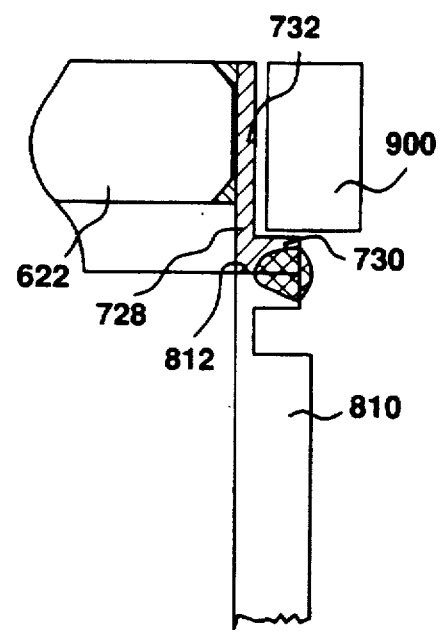
FIG. 20 is a partial cross-sectional view of an optical window assembly having a braze ring constructed in accordance with another embodiment of the present invention.

An alternative embodiment of the hermetically sealed optical window assembly for use in a radiation detector is illustrated in FIG. 20. In this embodiment, a scintillation shield 810 is welded to a L-shaped ring 728. Shield 810 is sized such that its length and the length of the ring 728 fits properly in a radiation detector housing.

The ring 728 includes a braze leg 732 and a base leg 730. The sapphire wafer 622 is brazed to braze leg 732 and the base leg 730 is welded to a surface 812 of shield 810. During the welding process, a heat sink 900, like heat sink 800, is positioned radially exterior to braze leg 732 to draw the heat from the welding process away from the wafer 622.

The advantage in using the arrangement illustrated in FIG. 20 is that the diameter of the wafer 622 can be as great as the internal diameter of the shield 810, which is larger than the diameter of the wafer 622 possible in combination with the U-shaped ring 708. Further, the L-shaped ring may be formed of Kovar, which will allow integration of a sapphire wafer 622 into a stainless steel shield. As with the U-shaped ring, the L-shaped ring allows for effective welding to the shield without over stressing the braze joint and it also allows for accurate positioning and orientation of the sapphire wafer 622 during brazing and accurate positioning of the assembly in the shield.

Figure 21:
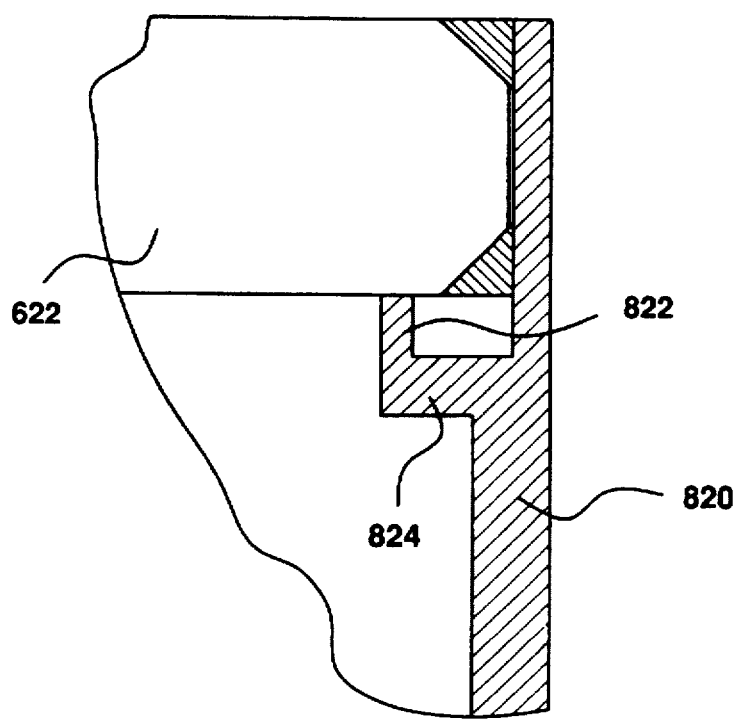
FIG. 21 is a partial cross-sectional view of an optical window assembly constructed in accordance with another embodiment of the present invention.

An alternative embodiment of the hermetically sealed optical window assembly for use in a radiation detector is illustrated in FIG. 21. In this embodiment, the sapphire wafer 622 is brazed directly to scintillation shield 820, which is formed of titanium. Shield 820 includes a stanchion 822 and a stanchion base 824.

The wafer 622 is placed upon the shield stanchion 822 with braze material around the periphery of the wafer 622. The shield 820 and wafer 622 are then placed in an oven, which melts the braze material, thus brazing the wafer 622 to the shield 820.

The advantage to the arrangement illustrated in FIG. 21 is that it allows a window aperture larger than the element 14, which allows for maximum transmission of light from the element 14. Further, this arrangement eliminates the need for any form of braze ring.

The designs of the optical window assemblies illustrated in FIGS. 19-21 allow for a greater diameter of the sapphire wafer 622. As noted above, a greater diameter window has lessened light transmission occurring at the edges of the window. Further, larger diameter windows are necessary to take full advantage and benefit of larger crystals.

Additionally, the designs of the optical window assemblies illustrated in FIGS. 19-21 allow the window to be geometrically positioned precisely where it is needed and allows for a suitable weld to be made to the scintillation shield or other supporting structure.

As will be noted from the above description of the various aspects and embodiments, a combination of several design arrangements provides enhanced performance of the radiation detector. The unique radial and axial support structure of the crystal allows for a greater sized crystal to be utilized within standard radiation detector housings. The unique optical window assemblies described above allow for a greater diameter window, which takes advantage of the greater crystal size, and assists in proper positioning of the window, which itself affects the spatial requirements of detector assemblies. The use of thinner sapphire provides even more room for a larger crystal and provides strength for high internal loading.

The above description and drawings are only illustrative of certain preferred versions which achieve the objects, features and advantages of the present invention. It is not intended that the present invention be limited to these versions. For example, while a scintillation element is denoted, it is to be understood that any element capable of receiving radiation and transforming that radiation into light impulses is within the scope of the present invention. Also, although a photomultiplier tube is noted, it is to be understood that the present invention includes all such devices that can receive and quantify light impulses. Further, the present invention may be employed with materials other than sapphire, titanium, aluminum, Kovar and inconel. Additionally, although certain embodiments have been illustrated, it is to be understood that various aspects of the invention are interchangeable. For example, the hermetically sealed optical window embodiments using sapphire may be employed with any of the axial and radial support structures, or their equivalents, described herein. Any modification of the present invention which comes within the spirit and scope of the appended claims is considered part of the invention.

What is claimed as new and desired to be protected by Letters Patent of the United States is:

1. A unitized radiation detector assembly comprising:
   means for receiving and transforming radiation into light impulses;
   a rigid scintillation shield receiving said radiation receiving and transforming means, said shield having an open end;
   means for receiving and quantifying said light impulses;
   elastomeric material surrounding said light impulse receiving and quantifying means, said elastomeric material including a plurality of outwardly extending projections;
   an inner housing surrounding said elastomeric material, said inner housing having a plurality of openings for receiving said projections;
   an optical coupling positioned between said radiation receiving and transforming means and said light impulse receiving and quantifying means, wherein said optical coupling is in contact with said means for receiving and transforming radiation into light impulses, said optical coupling including an optical window and a first plurality of concentric ridges;
   a compression cap located at an end of said light impulse receiving and quantifying means farthest from said optical coupling, said compression cap axially biasing said light impulse receiving and quantifying means toward said optical coupling;
   a first pad positioned between said light impulse receiving and quantifying means and said compression cap; and
   radially disposed shock absorbing means, wherein said shield is radially supported by said shock absorbing means.

2. A unitized radiation detector assembly according to claim 1, wherein one or more of said first ridges have a flat surface extending generally parallel to a surface of said optical window.

3. A unitized radiation detector assembly according to claim 1, further comprising a quantity of fluid retained by said first ridges.

4. A unitized radiation detector assembly according to claim 3, wherein said optical coupling further includes:
   a second optical coupling having a second plurality of concentric ridges, said second optical coupling positioned between said optical window and said light impulse receiving and quantifying means;
   a second quantity of fluid retained by said second ridges;
   a third optical coupling having a third plurality of concentric ridges, said third optical coupling positioned between said second optical coupling and said light impulse receiving and quantifying means; and
   a third quantity of fluid retained by said third ridges.

5. A unitized radiation detector assembly according to claim 1, wherein said optical window is made of sapphire.

6. A unitized radiation detector assembly according to claim 1, wherein said radiation receiving and transforming means includes a scintillation element, and wherein reflective tape surrounds said scintillation element within said shield.

7. A unitized radiation detector assembly comprising:
   means for receiving and transforming radiation into light impulses;
   means for receiving and quantifying said light impulses;
   a detector housing surrounding said radiation receiving and transforming means and said light impulse receiving and quantifying means;
   elastomeric material surrounding said light impulse receiving and quantifying means, said elastomeric material including a plurality of outwardly extending projections;
   an inner housing surrounding said elastomeric material, said inner housing defining openings receiving said projections;
   an axial biasing and expansion means positioned between said radiation receiving and transforming means and an end of said detector housing; and
   an elastomeric boot positioned between said inner housing and said detector housing.

8. A unitized radiation detector assembly according to claim 7, wherein said light impulse receiving and quantifying means includes a photomultiplier tube and wherein said axial biasing and expansion means is a two-stage biasing and expansion means for providing a biasing force between said radiation receiving and transforming means and said end of said detector housing and to allow for expansion of said radiation receiving and transforming means.

9. A unitized radiation detector assembly according to claim 8, wherein a first stage of said two-stage biasing and expansion means is provided parallel to a second stage of said two-stage biasing and expansion means.

10. A unitized radiation detector assembly according to claim 9, wherein said first stage is sized to provide a constant minimum force on said radiation receiving and transforming means sufficient to maintain adequate load during ambient and sub-ambient conditions and said second stage is positioned to assume load at elevated temperatures.

11. A unitized radiation detector assembly according to claim 10, wherein said first stage is an axial spring and a said second stage is an elastomeric pad, said elastomeric pad being offset from said axial spring.

12. A unitized radiation detector assembly according to claim 8, further including a hermetically sealed optical window assembly and an end cap, said optical window assembly being positioned between said light impulse receiving and quantifying means and said radiation receiving and transforming means, said end cap being positioned at an end of said light impulse receiving and quantifying means farthest from said optical window assembly.

13. A unitized radiation detector assembly according to claim 12, further including:

a first pad positioned between said light impulse receiving and quantifying means and said end cap;

a compression cap positioned between said first pad and said end cap;

second and third pads positioned adjacent to one another and between said compression cap and said end cap; and wherein said compression cap axially biases said light impulse receiving and quantifying means toward said optical window assembly, and wherein said pads provide additional axial support and cushioning for said light impulse receiving and quantifying means.

14. A unitized radiation detector assembly according to claim 13, wherein said inner housing includes an inwardly projecting surface at an end closest to said optical window assembly.

15. A unitized radiation detector assembly according to claim 14, wherein said optical window assembly includes:

an optical window transparent to said light impulses;

an optical material/metal seal assembly positioned circumferentially outwardly of said optical window, said seal assembly including an outer projection;

a lock ring positioned circumferentially outwardly of said optical window between an end of said inner housing and said seal assembly outer projection;

a first elastomeric interface transparent to said light impulses positioned between said optical window and said light impulse receiving and quantifying means; and a second elastomeric interface transparent to said light impulses positioned between said optical window and said radiation receiving and transforming means.

16. A unitized radiation detector assembly according to claim 7, wherein said detector housing includes an inwardly projecting shelf, and wherein said inner housing includes a shelf, and further including spacers and compression springs mounted between said shelves, said spacers and compression springs providing additional axial support for said light impulse receiving and quantifying means.

17. A radial support system comprising:

a generally cylindrical element having an outer surface and a longitudinal axis;

a shield generally concentric and coextensive with said element and being spaced outwardly therefrom;

potting material disposed between said shield and said outer surface of said element; and a plurality of elongated radial biasing members disposed between said potting material and said shield, each said biasing member being positioned such that its length is parallel with said element longitudinal axis.

18. A radial support system according to claim 17, wherein said radial biasing members are springs.

19. A unitized radiation detector assembly including:

means for receiving and transforming radiation into light impulses;

means for receiving and quantifying said light impulses;

elastomeric material surrounding said light impulse receiving and quantifying means;

an inner housing surrounding said elastomeric material;

an optical window having an optical material with an exterior surface and a metal layer applied to said exterior surface by plasma spraying;

a compression cap located at an end of said light impulse receiving and quantifying means farthest from said optical window;

a first pad positioned between said light impulse receiving and quantifying means and said compression cap;

said elastomeric material including a plurality of outwardly extending projections surrounding said light impulse receiving and quantifying means;

a plurality of openings through said inner housing, said openings receiving said projections; and wherein said compression cap axially biases said light impulse receiving and quantifying means toward said optical window.

20. A unitized radiation detector assembly according to claim 19, further including:

a rigid scintillation shield receiving said radiation receiving and transforming means, said shield having an open end; and radially disposed shock absorbing means, wherein said shield is radially supported by said shock absorbing means.

21. A unitized radiation detector assembly according to claim 20, wherein said radiation receiving and transforming means includes a scintillation element, and wherein reflective tape surrounds said scintillation element within said shield.

22. A scintillation package comprising:

means for receiving and transforming radiation into light impulses;

a rigid scintillation shield, said radiation receiving and transforming means being located within said shield, said shield being formed of titanium;

an optical coupling transparent to said light impulses, said optical coupling including a sapphire window and a plurality of concentric ridges, said ridges adapted to retain a quantity of fluid, said sapphire window being attached to an end of said shield;

radially disposed shock absorbing means, said shock absorbing means including potting material disposed between said shield and an outer surface of said radiation receiving and transforming means and a plurality of radial biasing members disposed between said potting material and said shield;

an end cap being attached to said shield at an end opposite said sapphire window; and axial biasing and expansion means positioned between said radiation receiving and transforming means and said end cap, said axial biasing and expansion means including an axial spring and an elastomeric pad, said elastomeric pad being offset from said axial spring.

* * * * *